United States Patent [19]
Brecht

[11] 4,120,504
[45] Oct. 17, 1978

[54] DISK TRACKING AND SUPPORT APPARATUS

[76] Inventor: William Buttfield Brecht, 114 Bloomingdale Ave., Wayne, Pa. 19087

[21] Appl. No.: 707,057
[22] Filed: Jul. 20, 1976
[51] Int. Cl.² ............................................. G11B 3/10
[52] U.S. Cl. ............................ 274/23 A; 274/39 R
[58] Field of Search ................. 274/23 A, 39 R, 39 A

[56] References Cited
U.S. PATENT DOCUMENTS

| | | | |
|---|---|---|---|
| 2,106,778 | 2/1938 | Volk | 274/39 R X |
| 3,103,364 | 9/1963 | Macks et al. | 274/39 R |
| 3,479,038 | 11/1969 | Eisner | 274/23 A |
| 3,572,724 | 3/1971 | Rabinow | 274/23 A |
| 3,674,278 | 7/1972 | Bowerman | 274/39 A |

*Primary Examiner*—Charles E. Phillips
*Attorney, Agent, or Firm*—Charles N. Quinn

[57] ABSTRACT

Improved apparatus and methods for tracking a stylus on a rotating disk are disclosed. The apparatus preferably takes the form of an inertially balanced four bar linkage. Also disclosed herein are improved apparatus for supporting a rotating disk, improved apparatus for driving a rotating platter which supports a disk and improved apparatus for following a stylus and supplying power thereto as it crosses the disk.

41 Claims, 10 Drawing Figures

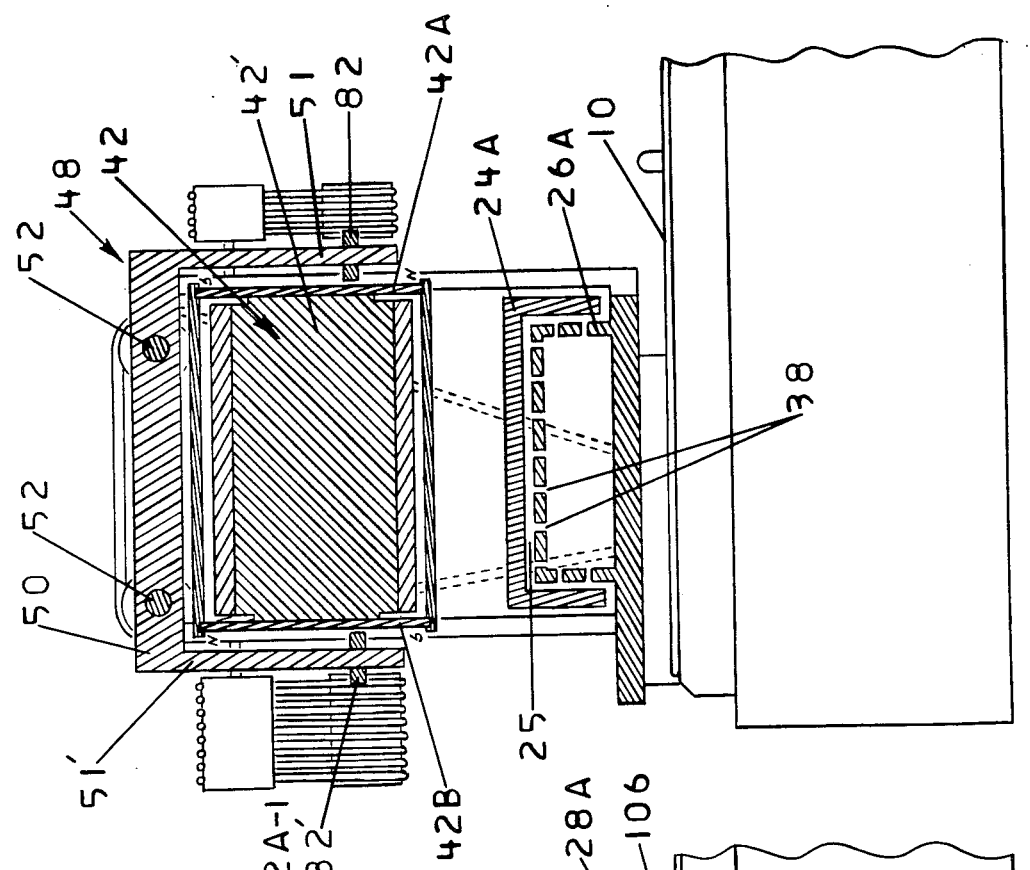
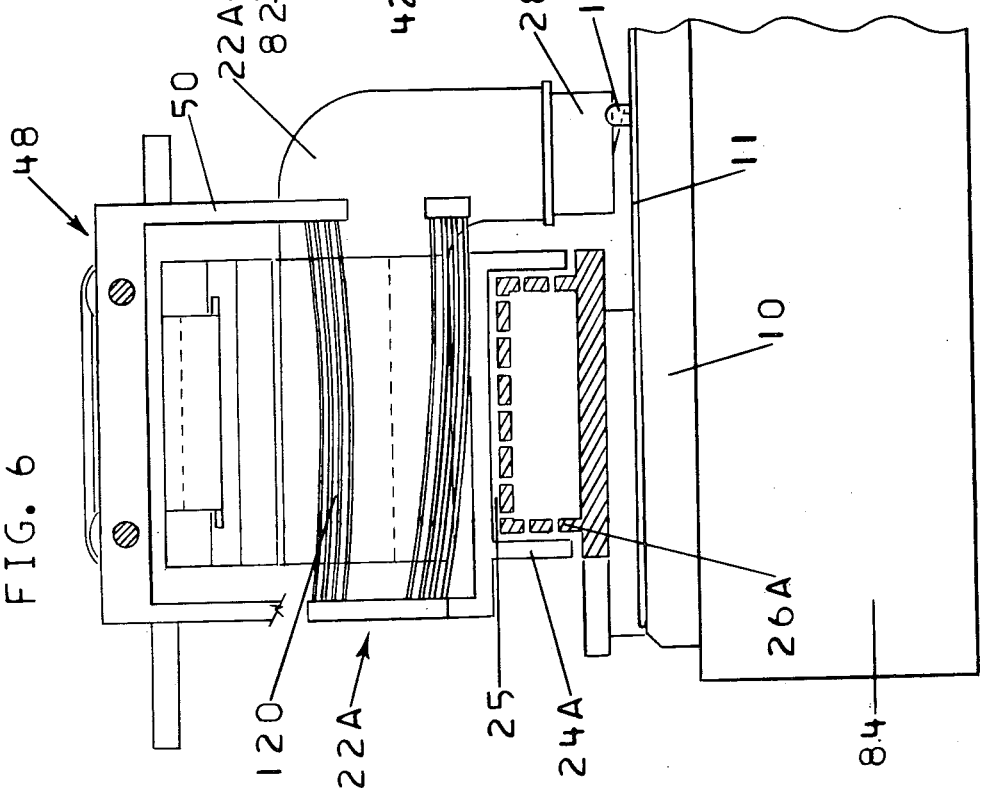

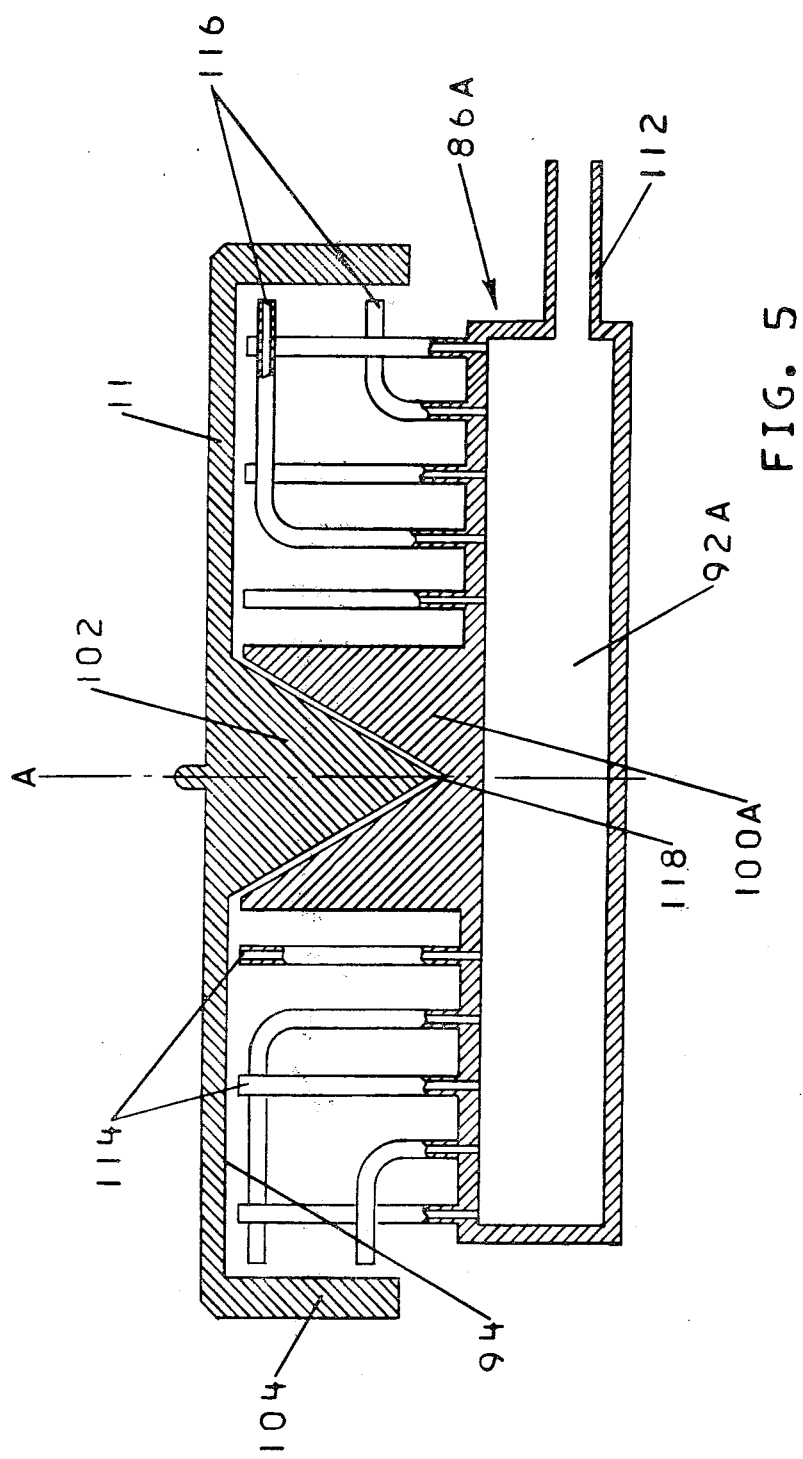

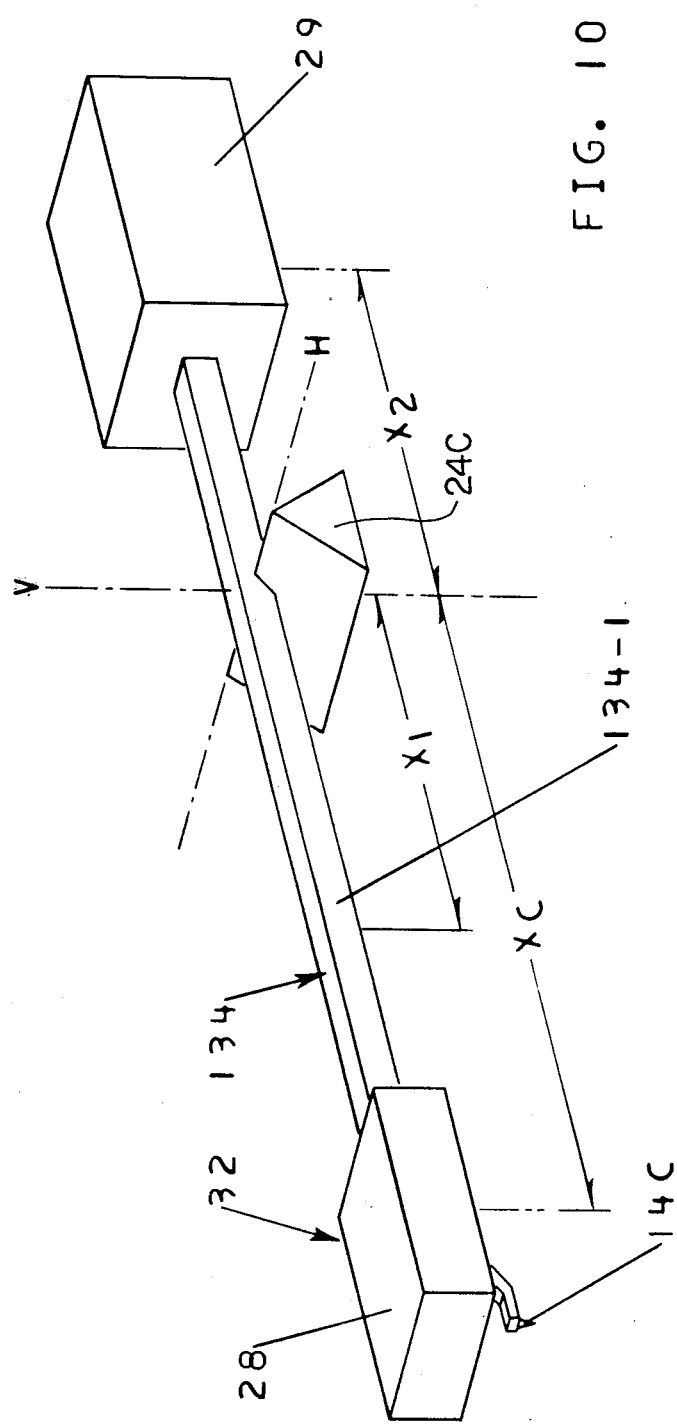

DISK TRACKING AND SUPPORT APPARATUS

DESCRIPTION OF THE PRIOR ART AND SUMMARY OF THE INVENTION

When a groove signal is cut into a master disk, such as an audio disk, a groove cutting die is moved across the disk, along a straight line passing through the axis of rotation of the disk as the disk is rotated. A cutting die coordinate system may be defined with one axis coincident with the straight line traveled across the master disk by the die as it cuts the groove in the rotating master disk, a second axis coincident with the axis of rotation of the master disk and a third axis formed by creating a three axis system, in the right-hand sense, from the first two axes. This third axis is parallel to a line which if drawn would be tangent to the signal groove cut by the cutting die in the rotating disk where the first axis crosses the signal groove. This third axis is, of course, in the plane of the rotating master disk. During cutting of the signal groove, the cutting die is constrained from moving parallel to the third axis of the cutting die coordinate system and is constrained from any rotation in any sense about any of the three axes of the cutting die coordinate system.

A stylus is used to pick up the signal from a groove in the master disk or from a groove in any disk made from the master disk. Ideally, for a stylus to track the groove most accurately, the stylus should follow the path traveled by the cutting die as the die cut the signal groove in the master disk. For purposes of stylus tracking on the disk, a three axis tracking coordinate system may be defined. The first axis of the tracking coordinate system is formed along a straight line followed by the stylus as it tracks the groove radial to the disk and in the plane of the disk, passing through the axis of rotation of the disk. The first axis is preferably but not necessarily coincident with the straight radial line on the disk tracked by the cutting die in creating the master disk. The second axis of the tracking coordinate system is coincident with the axis of rotation of the disk. The third axis of the tracking coordinate system is formed by creating a triad, with the two previously defined axes, in the right hand sense. This third axis is parallel to the groove tangent line at the point of stylus contact with the groove. If the first axis of the tracking coordinate system is coincidental with the first axis of the cutting die coordinate system, meaning that the stylus tracking the groove follows the same path as followed by the cutting die in creating the groove signal, the first, second and third axes of the tracking coordinate system will be at all times parallel respectively to the first, second and third axes of the cutting die coordinate system. As noted, for the stylus, used to pick up the signal from the helical groove in the master disk or any disk made from the master disk, to most accurately track the groove signal in the master disk or any disk made from the master disk, the stylus should follow a radial straight line path on the disk, similar but not necessarily parallel to the path followed by the cutting die in creating the groove signal. If the three axes of the tracking coordinate system are designated as X', Y' and Z' axes respectively, the stylus must be free to move along the X' axis as the stylus remains in the signal groove while the disk rotates. The stylus must also be free to move parallel to the Y' axis in response to vertical groove irregularities. The stylus must be constrained from movement parallel to the Z' axis. If the disk is assumed to be substantially planar, the stylus must also be constrained against rotation about any of the three axes.

Conventional cartridges, consisting essentially of a stylus and a stylus holder, are engineered and constructed with reference to a stylus design three axis coordinate system. Conventionally the three axes of the stylus design three axis coordinate system are comprised of a vertical axis and two horizontal axes. The vertical axis is intended to be at all times perpendicular to the surface of the groove in the disk that the stylus is tracking. A first one of the two horizontal axes is preferably, at all times, parallel to the surface of the disk the stylus is tracking and is preferably coincidental, at all times, with the line the stylus travels across the disk. The second horizontal axis, the third axis of the stylus design coordinate system, is formed by creating a triad, in the right-hand sense, from the first two axes of the stylus design coordinate system. Of course, a stylus design coordinate system may be defined for all cartridges or stylus designs. The stylus design coordinate system may vary from stylus to stylus, where these are produces by different manufacturers or designers, since the stylus design coordinate system is a function of a particular manufacturer's design philosphy. The cartridge is designed so that the stylus most desirably tracks the rotating disk with each axis of the stylus design three axis coordinate system respectively maintained parallel to the X', Y', Z' tracking coordinate system, for optimum performance of the stylus in following the groove signal. "Zero tracking error" of the stylus is defined as the absence of a non-parallel condition of any axis of the stylus design three axis coordinate system with the respective corresponding axis of the tracking coordinate system.

Conventional audio systems with tone arms which pivot about a fixed point or axis inherently have tracking error about all three axes of the tracking coordinate system, since as the stylus travels across the disk, the end of the tone arm to which the stylus is attached must rotate about the tone arm pivot point. Upon such rotation, misalignment of the two horizontal axes, parallel to the disk, of the stylus design coordinate system, with the X' and Z' axes of the tracking coordinate system defined above must occur. This is because the arm pivots in the X'-Z' plane about an axis parallel to the Y' axis to maintain the stylus on the disk as the stylus moves across the disk surface towards the axis about which the disk rotates. Also, when the stylus encounters a vertical irregularity in the disk, misalignment of the vertical axis of the stylus design coordinate system with the Y' axis defined above must occur since the arm pivots about an axis which is parallel to the X'-Z' plane. Accordingly, when the stylus, attached to a conventional tone arm, moves vertically, the stylus along an arc, not along a line parallel to the Y' axis.

Some prior art devices have eliminated the tone arm which pivots about an immovable point. Apparatus such as disclosed in U.S. Pat. Nos. 3,101,952, 3,235,267 and 3,771,797 allows the stylus to move at least somewhat radially across the disk. However in the apparatus disclosed in these patents' upon encounter with a vertical irregularity on the disk, the stylus, rather than moving vertically along a straight line perpendicular to the surface of the disk, moves in an arc about an axis of rotation which is substantially parallel to the line the stylus travels across the disk.

Other apparatus also allows the stylus to move only somewhat radially across the disk. These apparatus, which allow the pivot point of the tone arm to move as the stylus tracks across the disk, provide improvements over the conventional fixed pivot point tone arm. However these apparatus require that the stylus move an incremental amount across the disk whereupon the moveable stylus arm or tone arm mounting point moves, in response to the movement of the stylus, to keep the arm supporting the stylus approximately parallel to a line tangent to the groove at the position of the stylus in the groove.

Apparatus disclosed herein is an improvement over the prior art in that the disclosed apparatus provides stylus tracking along the disk with zero tracking error. The apparatus disclosed herein accomplishes this by maintaining the three axes of the stylus design coordinate system at all times parallel with the corresponding X', Y' and Z' axes of the tracking coordinate system described above as the stylus tracks the groove signal radially inward on the disk and as the stylus encounters vertical irregularities in the disk.

Also disclosed herein is fluid supported stylus tracking apparatus for allowing a stylus to track over a disk with a practical minimum of frictional resistance to movement while isolating the stylus from outside forces, a fluid supported platter for supporting a disk as the disk rotates with the platter with a self-aligning and supporting platter landing device and a self-compensating platter rotational alignment device for maintaining the platter accurately about a center vertical axis of rotation while isolating the platter from outside vibration. Air supported platters are shown in U.S. Pat. Nos. 3,103,364, 3,674,278, 3,751,044 and 3,801,165; the structure facilitating fluid support of the platter disclosed herein is an improvement over that shown in the prior art particularly, but not entirely, because of the self-aligning and supporting platter landing device and the self-compensating platter rotational alignment device for maintaining the platter accurately about its center vertical axis of rotation. The self-compensating platter landing device allows self-positioning of the platter symmetrical about its axis of rotation when platter rotation is halted and fluid support is removed. The self-compensating rotational alignment device allows frictionless rotation of the platter about a base, around a substantially stationary axis of rotation.

Additionally disclosed herein is an inertially balanced tone arm which allows maintenance of a constant magnitude force downward on the stylus even as the stylus encounters vertical irregularities in the groove and is subjected to accelerations produced by outside sources.

Further additionally disclosed herein is apparatus for following a stylus support assembly and for providing power to a cartridge as the stylus tracks a groove signal on a rotating disk, where stylus tracking movement is due solely or partly to contact between the disk and the stylus as the stylus is resident in the signal groove in the rotating disk.

Still further disclosed are methods for tracking a stylus on a rotating disk with substantially zero tracking error and methods for following a stylus and supplying power thereto as the stylus tracks across a rotating disk substantially in response to forces exerted on the stylus by the signal groove in the rotating disk.

BRIEF DESCRIPTION OF THE DRAWINGS

FIG. 3 is a sectional view of the apparatus shown in FIG. 2, taken along the lines and arrows 3—3 in FIG. 2.

FIG. 5 is a sectional view of an alternative embodiment of apparatus for rotating a disk with the section taken through the preferred center axis of rotation of the disk rotation apparatus.

FIG. 6 is a sectional view of the apparatus shown in FIG. 2, taken along the lines and arrows 6—6 in FIG. 2.

FIG. 10 is a schematic representation of an inertially balanced tone arm.

Figure 1:
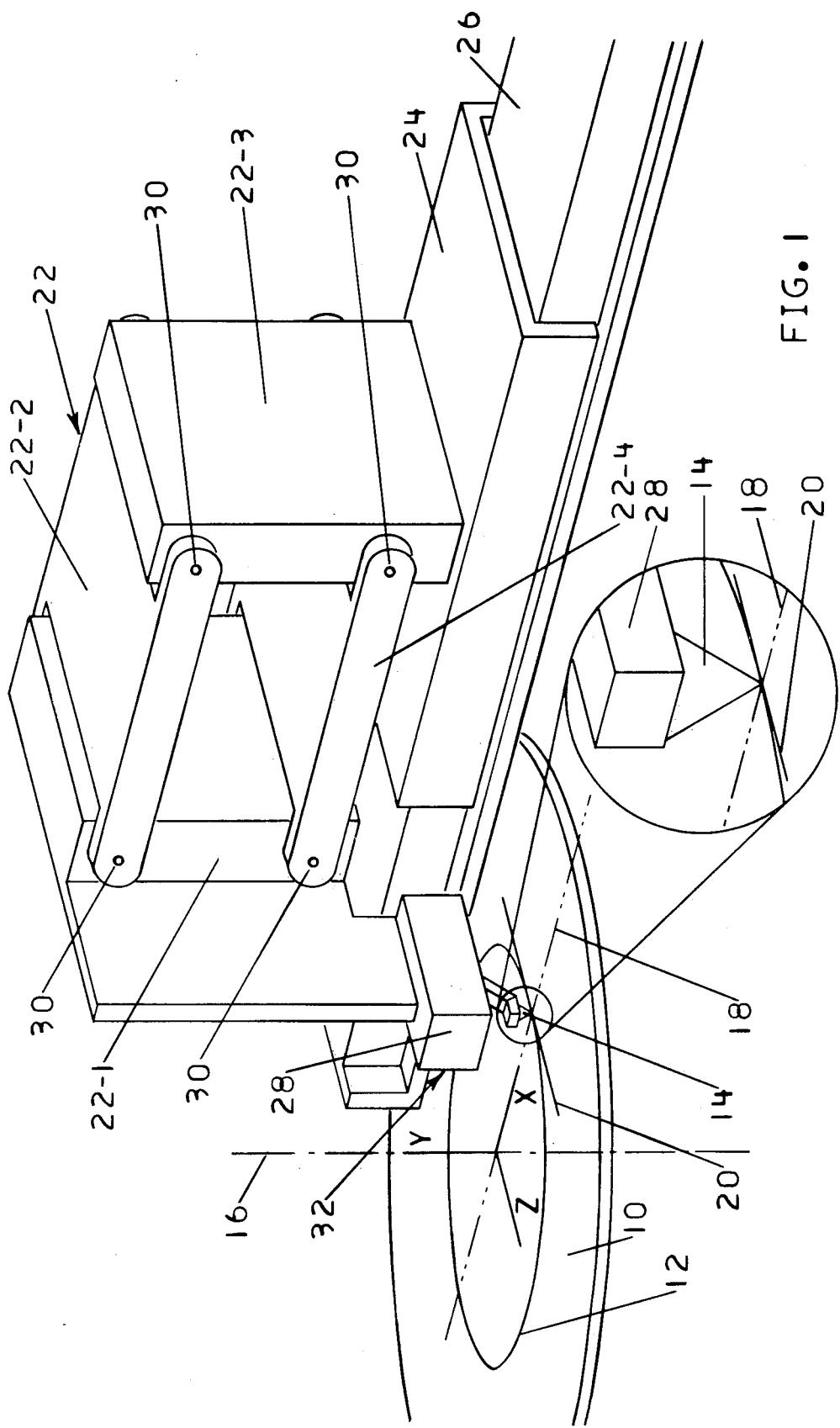
FIG. 1 is a schematic representation of a stylus tracking a groove signal on a rotating disk with a reference coordinate system shown.

In the drawings, lower case alphabetic letters denote parts, in different embodiments, which have similar functions.

DESCRIPTION OF THE PREFERRED EMBODIMENTS

Reference is made to FIG. 1. A rotating disk 10 is shown schematically with a signal groove 12 therein. A stylus 14 tracks groove 12 as the disk rotates about axis 16. A three axis x-y-z coordinate system is arbitrarily established, for purposes of clearly explaining the structure and operation of the invention, with the y axis coincidental with axis of disk rotation 16. Disk 10 rotates in the x-z plane and stylus 14 moves radially with respect to disk 10 along a straight line 18 coincident with the x axis. The z axis is the third axis of the right-hand triad x-y-z and as such the z axis is perpendicular to the x-y plane. Straight line 20 is drawn tangent to groove 12, at the point of stylus contact, and is coincident with the z axis. Thus when the stylus is at the axis of rotation of the disk, straight lines 18, 16 and 20 respectively are congruent with the x, y and z axis of the coordinate system. Straight lines 18, 16 and 20 are illustrated to aid in teaching the function, structure and operation of the present invention. Straight lines 18, 16 and 20 form the tracking coordinate system referred to above.

Movement of the stylus 14 is constrained to be in a plane, parallel to the x-y plane, which passes vertically through the disk surface and through lines 18 and 16, by a four bar linkage designated generally 22, which is supported by support means 24. Support means 24 is moveable along a low friction track 26. Track 26 is parallel to the x axis and to radial line 18, but need not be in either the x-y or x-z planes. Track 26 provides means for guiding support means 24 along the line of the track, parallel to line 18, and is designated to allow movement of support means 24 therealong in a direction parallel to the x axis.

A stylus holder 28 connects the stylus 14 to the first bar 22-1 of the four bar linkage 22. The combination of stylus 14 and stylus holder 28 form a cartridge 32, which may be of the conventional type. First bar 22-1 is pivotally connected to a second bar 22-2 and to a fourth bar 22-4 by any suitable pivotal connection means 30 which preferably is of the low friction type. Suitable pivotal connection means include knife edges, pins, needle points and the like. Second and fourth bars 22-2 and 22-4 are parallel to each other and each is connected to third bar 22-3 by suitable pivotal connection means 30. Third bar 22-3 is connected to support means 24 for supporting the four bar linkage. The four bars 22-1, 22-2, 22-3 and 22-4 are disposed in a plane parallel to the y axis. The plane is preferably parallel to the x-y plane; other orientations of the plane, still parallel to the y axis, are also possible. When the four bar linkage 22 is disposed with all four links in a plane parallel to both the x and y axis, the four bar linkage is constrained by the pivotal connection means 30 to move only in the plane in which the four links are disposed.

Second bar 22-2 is preferably substantially horizontal when stylus 14 contacts disk 10; however this is not required.

As disk 10 rotates and stylus 14 tracks groove 12 therein, the stylus cannot move in the z direction due to the stylus being connected to first bar 22-1 by stylus holder or stylus connection means 28. First bar or link 22-1 is constrained to move only in the x-y plane by pivotal connection means 30 which restrain movement of the three moveable links 22-1, 22-2 and 22-4 of the four bar linkage so these three links move only in the plane, in this case the x-y plane, in which the four bar linkage is disposed. Four bar linkage 22 is preferably constrained from movement in the z direction by support means 24 which is preferably moveable to line 18 radial disk 10. In the embodiment illustrated, as the stylus tracks the groove, assuming a helical groove, the stylus moves towards the center of the disk along line 18 due to radial forces exerted on the stylus by the edge of the groove as the groove spirals inward. The stylus does not move in the z direction due to the constraint imposed therein by four bar linkage 22. Thus, frictional forces on stylus 14, which tend to move stylus 14 along line 20 in the direction of disk rotation, are resisted by the constraining influence of four bar linkage 22 on stylus 14.

Radial force exerted on stylus 14 and acting along line 18, which is radial to disk 10, causes the entire assembly of four bar linkage 22 and support means 24 to move with stylus 14 on low friction track 26 in the direction of line 18.

As the stylus moves and tracks the groove, it may encounter vertical irregularities on the disk. Stylus movement in the vertical direction, in response to vertical irregularities of the disk, causes corresponding vertical movement of first bar 22-1, due to the structural connection between the stylus and the first bar. Vertical movement of first bar 22-1 results in rotation of second and fourth bars 22-2 and 22-4 with respect to first bar 22-1, and with respect to third bar 22-3 at pivotal connection means 30. Since the four bars of four bar linkage 22 are all rigid bars, the vertical movement of first bar 22-1 with consequent rotation of second and fourth bars 22-2 and 22-4 results in lateral movement of third bar 22-3 in the x direction. Support means 24 moves with third bar 22-3 laterally along track 26, in the x direction. Thus, upon encountering vertical irregularities in the disk, stylus 14 remains vertical and does not rotate about any of the three axes x, y and z, nor does the stylus move out of the plane parallel to the xy plane passing through lines 18 and 16. All movement of support means 24 and hence four bar linkage 22 along the line of track 26 is created by movement of the stylus along line 18 in the x-z plane and by vertical movement of the stylus perpendicular to the x-z plane.

Figure 2:
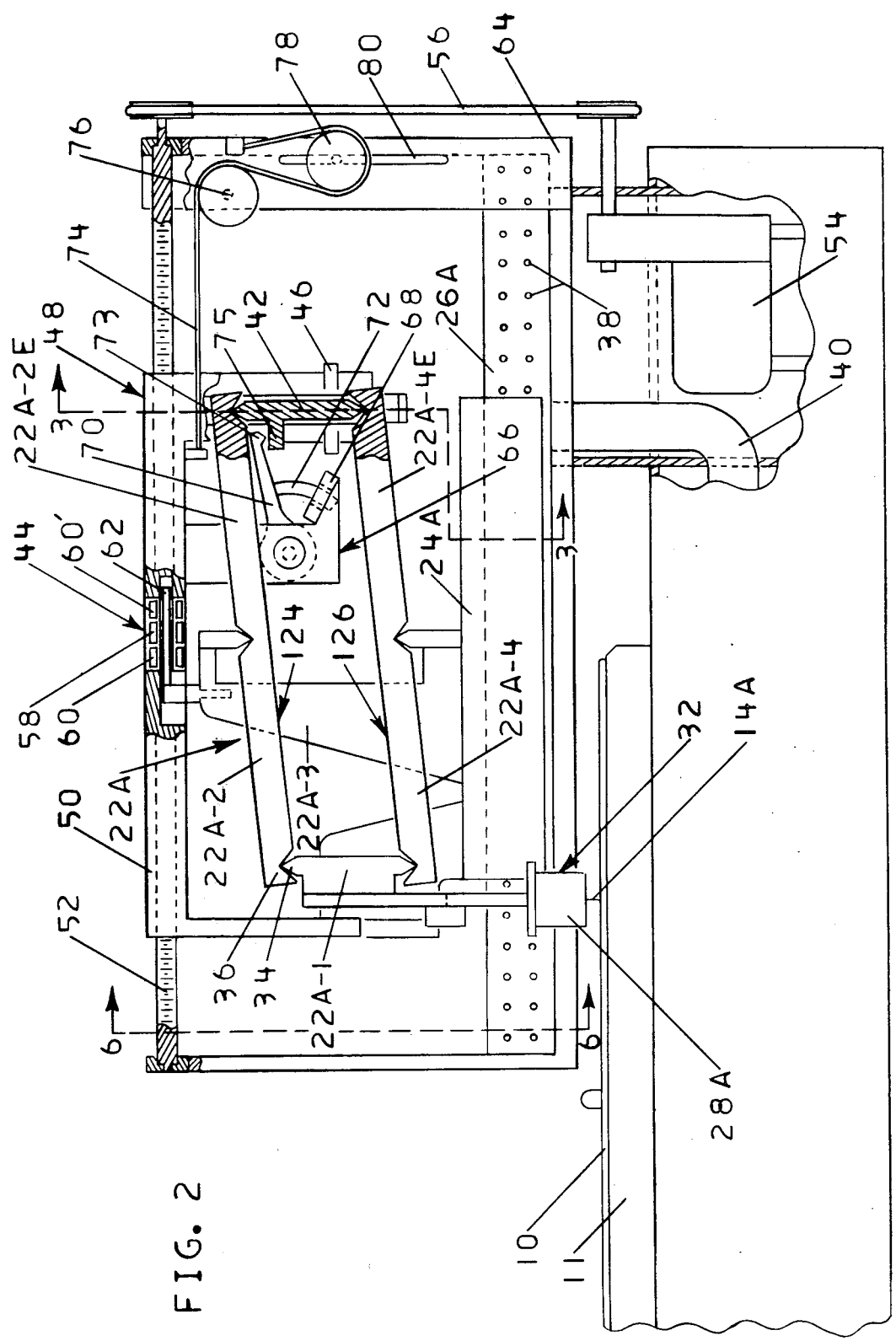
FIG. 2 is a side elevation view of the preferred embodiments of apparatus for rotating a disk, four bar linkage apparatus for causing a stylus to track a groove signal on the disk and apparatus for following a stylus as the stylus tracks the groove signal on the rotating disk.

Reference is made to FIG. 2 wherein there is shown a preferred embodiment of apparatus for tracking a stylus on a rotating disk, along a line which is radial to the rotating disk, and apparatus for following the stylus and stylus tracking apparatus as the stylus tracks along the disk. A stylus 14A is shown contacting rotating disk 10 and tracking a groove therein which is not visible in FIG. 2. Disk 10 is supported on rotatable platter 11. Stylus 14A is connected to a first bar 22A-1 of a four bar linkage 22A by a stylus connection means 28A. The stylus 14A and the stylus holder or stylus connection means together comprise a cartridge designated 32. The cartridge may be a conventional cartridge. First bar 22A-1 is connected to second bar 22A-2 and to fourth bar 22A-4 by pivotal connection means preferably formed by a knife edge 34 in engagement with a knife edge receiver 36. Second and fourth bars 22A-2 and 22A-4 are similarly pivotally connected to third bar 22A-3 which in turn is rigidly connected to four bar linkage support means 24A. Second and fourth bars 22A-2 and 22A-4 are each preferably slightly bowed, with the convex faces of the two bars, convex face 124 of second bar 22A-2 and convex face 126 of fourth bar 22A-4, disposed proximate to and facing towards one another. The bow of the two bars 22A-2 and 22A-4 produces a spring effect on the third bar; third bar 22A-3 serves to retain the second and fourth bars 22A-2 and 22A-4 from separating further apart. The retention of the second and fourth bars by the third bar and the bow of the second and fourth bars in combination with the pivotal connection means by which the bars are connected together serve to retain the four bar linkage 22A illustrated in FIG. 2 in an assembled disposition. Four bar linkage support means 24A is moveable along track 26A which is preferably disposed along a line parallel the line radial disk 10 along which stylus 14A tracks. Track 26A has a plurality of preferably symmetrically spaced holes 38 therein through which a fluid, preferably air, escapes. The fluid is fed to the at least partially hollow interior of the track through pipe 40. As the fluid escapes from holes 38, it forms, at least in the area where support means 24A is over track 26A, a fluid cushion between support means 24A and track 26A. The fluid cushion allows substantially frictionless travel of support means 24A and hence four bar linkage 22A along track 26A in response to radial forces exerted on stylus 14A as the stylus tracks the groove which spirals inward in disk 10.

Four bar linkage 22A is preferably disposed in a plane perpendicular to disk 10 and is preferably inertially and gravitationally balanced with respect to a vertical axis passing through the two pivotal connection points on third bar 22A-3. More particularly, the second and fourth bars 22A-2 and 22A-4 each have counterbalance extensions thereof 22A-2E and 22A-4E which extend from second and fourth bars 22A-2 and 22A-4 past where the second and fourth bars are pivotally connected to third bar 22A-3. Disposed between the extensions 22A-2E and 22A-4E of the second and fourth bars and pivotally connected thereto is force receiver means 42.

Inertial and gravitational balance of four bar linkage 22A with respect to vertical accelerations is achieved by constructing the assembly of stylus 14A, stylus connection means 28A, first bar 22A-1, second bar 22A-2, fourth bar 22A-4, second bar extension 22A-2E, fourth bar extension 22A-4E and force receiver means 42 such that the sum of the vertical gravitational moments of all these elements, about a plane parallel to the y-z plane and passing through the pivot points at which second and fourth bars 22A-2 and 22A-4 contact third bar 22A-3, is zero. More specifically, if the cartridge, consisting of the stylus and the stylus holder, has a mass $M_c$, the first bar has a mass $M_{B1}$ with a center of mass located at distance $X_{B1}$, measured along an arbitrary straight line, from a vertical line passing through the two points at which the second and fourth bars are pivotally connected to the third bar, the cartridge is secured to the first bar with the center of mass of the cartridge located distance $X_c$ from the vertical line passing through the pivotal connection points on the third bar, the second bar has a mass $M_{B2}$ with the center of mass located distance $X_{B2}$ from the vertical line, the fourth bar has a mass $M_{B4}$ with the center of mass located distance $X_{B4}$ from the vertical line, and the counterbalance, whether consisting only of extensions of either or both of the second and fourth bars or of such extensions plus force exerting means, etc., has a mass $M_{CB}$, if the center of mass of the counterbalance is located at distance $(M_c X_c \& M_{B1}X_1 \& M_{B2}X_2 \& M_{B4}X_4)/M_{CB}$ measured from the vertical line, but in a direction opposite the other distances $X_c$, $X_1$, $X_2$ and $X_4$, the four bar linkage assembly is inertially balanced for vertical components of acceleration applied to the four bar linkage assembly through the four bar linkage support means. When this gravitational balance is achieved by making the sum of the vertical gravitational moments zero, the assembly is also thereby inertially balanced with respect to the vertical components of all accelerations to which the assembly may be subjected.

Since the assembly is inertially balanced, external vertical components of acceleration do not affect it. For instance, if the entire disk - platter - four bar linkage and stylus combination illustrated in FIG. 2 is accelerated downwardly by the structure, such as a table, supporting this combination being jostled, the entire four bar linkage moves downwardly as the third bar descends. The stylus would not bounce on the disk due to the zero sum of the vertical moments of the stylus holder, four bar linkage and counter balance extensions about the pivotal connections of the third and fourth bars and of the third and second bars. So long as the complete system, that is the stylus and stylus holder, four bar linkage, counter/balances and four bar linkage support structure, is accelerated in the vertical direction there will be no tendency for the stylus to move relative to either the platter, which would result in the stylus bouncing on the platter, or the third bar due to the inertial balance of the four bar linkage assembly. The inertial balance of the four bar linkage results in forces, on either side of the linkage about the pivotal mounting connection structure to the third bar, being equal. Hence a balanced condition is maintained no matter what magnitude of vertical components of acceleration are applied to the linkage and associated structure.

As disk 10 rotates, stylus 14A tracks a groove signal therein and moves from right to left in FIG. 2 due to radial forces exerted on the stylus by the edge of the groove. This movement is the same as described above with reference to FIG. 1. Stylus connection means 28, four bar linkage 22A and support means 24A move on the fluid cushion along track 26A as the stylus tracks the groove and moves radially inward on disk 10.

Downward force on stylus 14A is produced by exerting an upward force on force receiver means 42. The required upward force is produced on force receiver means 42 by coil 46.

As four bar linkage 22A and support means 24A move on the fluid cushion along track 26A and as stylus 14A tracks the groove and moves radially inward on the disk, a moveable portion of a powered apparatus for following a stylus tracking a groove signal, designated generally 48, senses movement of the stylus — stylus holder — four bar linkage assembly and moves to follow the stylus to carry electrical power to the stylus. The moveable portion of the stylus follower, referred to as a carrier and designated generally 50, moves along an elevated track 52 which is generally elevated above and oriented along a path followed by stylus 14A as it tracks across the disk. A means is provided for moving the carrier reciprocably along track 52. In the embodiment illustrated, the carrier movement means is a motor 54 which rotates a threaded screw, which forms the track, by a flexible belt or cable 56. Carrier 50 has complemental threads, not shown, for mating with the threaded portion of track 52. Rotation of threaded track 52 results in movement of carrier 50 therealong.

Movement of the stylus — stylus holder — four bar linkage assembly along the track is sensed by a stylus movement sensing means designated generally 44. In the embodiment illustrated, stylus movement sensing means 44 is comprised of a linear variable differential transformer (LVDT) which in turn is comprised of a centrally disposed AC coil 58 flanked by outboard DC coils 60 and 60'. An iron core 62 is rigidly connected to the third bar of the four bar linkage, for movement therewith as the stylus — stylus holder — four bar linkage assembly moves reciprocably along track 26. Conventional amplifying circuitry connects the linear variable differential transformer to motor 54, for affecting movement of the stylus follower in response to stylus movement. The entire elevated track is supported by base 64. Any suitable means could be used for stylus movement sensing means 44, such as a photocell, a mechanical limit switch assembly, and other movement sensing apparatus well known in the mechanical arts.

A stylus lifter designated generally 66 is provided for affecting vertical movement of the stylus when it is desired to lift the stylus off the disk. The stylus lifter generally comprises an electromagnetic coil 68 secured to the carrier 50. A pivotal arm 70 is pivotally connected to carrier 50 and has a preferably curved iron core 72 secured thereto. A nip end extension 73 of pivotal arm 70 contacts a lateral extension 75 of force receiver 42. When coil 68 is energized, downward force is created on iron core 72 which moves downwardly in response thereto. Downward movement of core 72 causes downward movement of force receiver means 42 with consequent upward travel of the first bar of the four bar linkage as the second and fourth bars pivot at their pivotal connections with the third bar.

Flexible electrical cable 74 moves over a fixed roller 76 and a moveable roller 78 to electrically connect the stylus via the stylus follower to a suitable signal receiver and electrical power supply, not shown. Moveable roller 78 moves vertically in slot 80 in response to movement of carrier 50, to maintain flexible electrical cable 74 in an orderly disposition.

Note that the stylus lifter 66 also provides a physical link or connection between the carrier 50 and the four bar linkage so that the carrier drive system may be used to position the stylus and the four bar linkage when the stylus is in a raised position, off the disk. When the stylus lifter is used for this purpose, the carrier movement means is controlled externally and the four bar linkage position sensing circuit associated with the LVDT is overridden by conventional override circuitry.

Reference is made to FIG. 3. Carrier 50 is shown in section with the elevated track 52 formed by two threaded horizontal shafts. Force receiver means 42 has a central portion 42' with vertically disposed permanent magnets 42A and 42B disposed at the lateral extremities thereof. Electromagnetic coils 82 and 82' are secured to downwardly extending portions 51 and 51' of carrier 50. Activation of the coils 82 an 82' produces upward force on the magnets 42A and 42B. This creates an upward force on the force receiver means 42 which in turn produces a downward force on first bar 22A-1. This creates a downward force on stylus 14A and on stylus holder 18A, which is secured to first bar 22A-1, thereby retaining the stylus in the groove of the disk while the stylus is tracking. Some of these elements cannot be seen in FIG. 3 but they are visible in FIG. 2.

Also shown in FIG. 3 in section is track 26A and support means 24A which is moveable along the track. Holes 38 in track 26A permit escape of fluid, preferably air, from the track. The escaping fluid dynamically forms a first fluid cushion in the area 25 between the track and the support means. Track 26A is preferably adjustable in its position above disk 10. Track 26A can be positioned substantially higher above disk 10 than shown in FIG. 3, if it is desired to use an automatic disk changer in conjunction with the stylus tracking apparatus and stylus — stylus holder — four bar linkage tracking apparatus shown.

Reference is made to FIG. 6. Disk 10 and platter 11 are again shown above the platter support means 84. The track 26A is shown in section with support means 24A thereabove dynamically supported by the first fluid cushion which is in the area 25 between the support means and the track. The stylus, hidden behind disk retaining nib 106, is connected via the stylus holder 28A to an extension porion of first bar 22A-1. Electrical connection to the stylus is provided by a plurality of wires 120. The wires are connected to a downwardly extending portion of carrier 50 at one end and, via an intermediate connection to a portion of the support means 24A, at the other end to the extended portion of first bar 22A-1. With this arrangement, the electrical connection to the stylus does not restrain the stylus and the four bar linkage assembly from moving across disk 10 freely in response to forces exerted on the stylus by a groove signal in disk 10. Similarly, with this arrangement, the stylus, and the first bar to which the stylus is connected, are free to move vertically in response to vertical irregularities in the signal groove in disk 10 or in the disk itself. As the stylus moves across the disk and up and down, and as the four bar linkage moves in response to movement of the stylus, first bar 22A-1 moves with respect to the support means 24A. Similarly, as the entire four bar linkage 22A moves on support means 24A across the disk, the carrier portion 50 of the power follower 48 is moved in response to movement of the four bar linkage. Thus there is relative motion between the four bar linkage 22A, support means 24A and the carrier 50. The wires do not restrain first bar 22A-1 from moving with the stylus even though the wires connect first bar 22A-1 with support means 24A, nor do the wires restrain four bar linkage 22A, which is only partially visiable in FIG. 6 from moving as the stylus moves even though the wires connect the support means, which supports the four bar linkage, with carrier 50. These absences of restraint are due to the extremely flexible characteristic of the wires and to the slack provided in the wires between the points of connection. The slack in the wires is illustrated by the drooping of the wires as shown in FIG. 6.

Although the track 26A as shown in FIG. 3 and 6 preferably has a generally rectangular cross-section in the area from which the fluid escapes to form the first fluid cushion in the area 25, it is to be understood that the track may be fabricated with the upper surface thereof, bordering area 25, in any suitable shape so long as the lower surface of support means 24 is substantially a complemental, slight proportionally larger mirror image of the upper surface portion of the track, whereby when the first fluid cushion is not preesent, these upper and lower surfaces are in contact.

Another suitable cross-sectional shape for the upper surface portion of the track and the lower surface portion of the support means is a triangular shape. Other suitable cross-sectional shapes for the upper surface portion of the track and the lower surface portion of the support means are circular or semi-circular cross-sections.

A plurality of tracks to support the support means, for travel of the support means therealong, may also be employed. The tracks could be below the support means and/or disposed on either side of the support means, outboard thereof.

Figure 4:
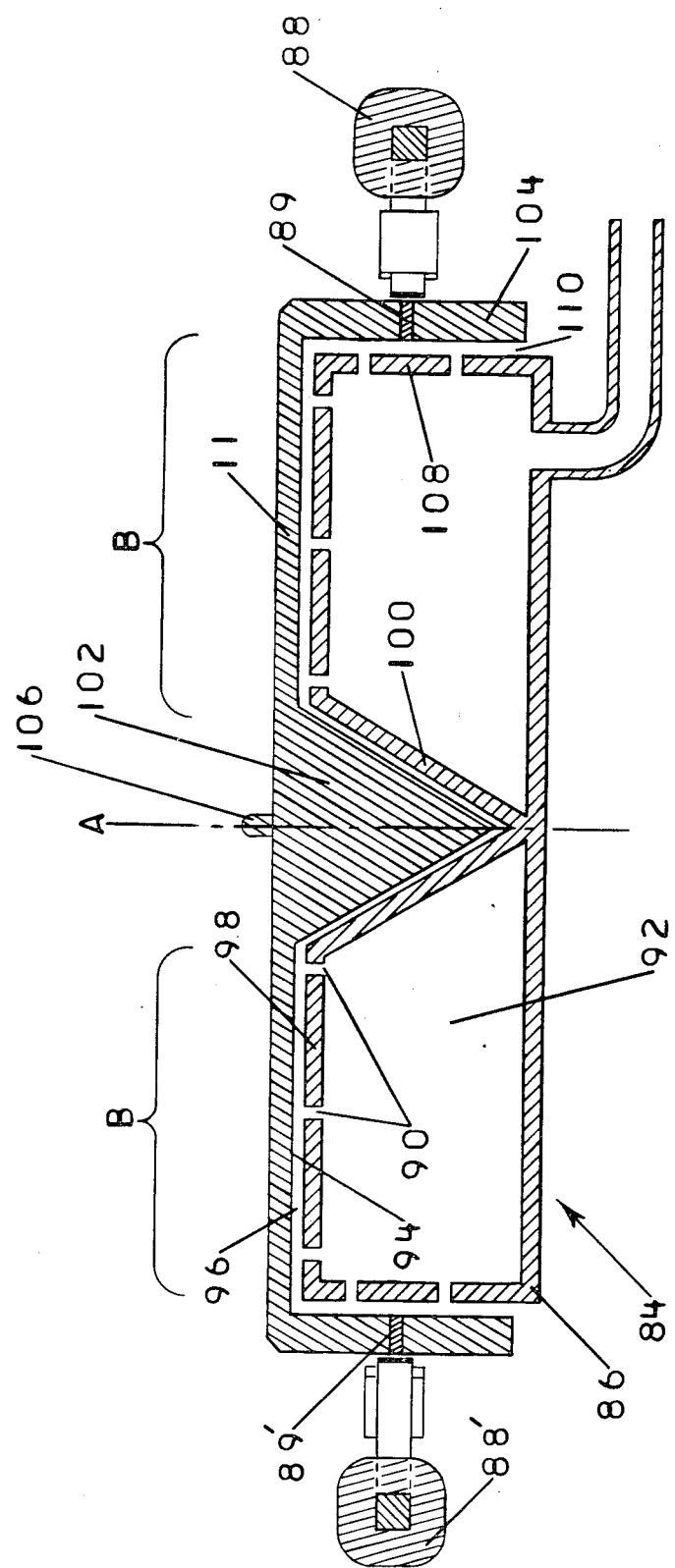
FIG. 4 is a sectional view of the preferred embodiment of apparatus for rotating a disk shown partially in FIG. 2 and 3, with the section taken through the preferred center axis of rotation of the disk rotation apparatus.

Reference is made to FIG. 4 wherein there is shown a sectional view of a preferred embodiment of the platter and platter support means partially shown in FIG. 2. The platter 11 and the platter support means, which is shown generally as 84, are preferably used in combination with the stylus, stylus holder, four bar linkage and four bar linkage support means discussed with reference to FIG. 2; however the platter 11 and platter support means 84 may be used with any suitable stylus and stylus tracking mechanism.

The platter 11 is rotatable above a base 86 about a preferred axis A of platter rotation. A portion of a means 88 for rotating the platter is connected, via any suitable connecting structure, to the base. In the preferred embodiment illustrated, the means for rotating the platter comprises two shade pole motor groups, electrically coupled via conventional electrical circuitry and designated 88 and 88'. These motors cooperate to rotate platter 11 about axis A by exerting force on force receiving means for the shade pole motor groups. The force receiving means in the embodiment illustrated preferably are permanent magnets 89 and 89'. Electromagnetic flux produced by the shade pole motor groups in the conventional manner act on the permanent magnets to produce a rotational force on the platter. Shade pole motors are well known in the electrical arts and further discussion of them is not deemed warranted here. Disposition of the force receiving means, preferably in this case permanent magnets 89 and 89', in pairs means that forces produced on the force receiving means have the inward radial components of the forces produced cancelled out due to the pair disposition of the force receiving means. Similarly, the pair disposition of the force receiving means results in the tangential or rotational components of force applied to the platter acting additively together (in the same rotational direction) to produce rotation of the platter and the supported disk.

Holes 90 in the upper portion of base 86 allow escape of a fluid, preferably air, from a fluid chamber 92, against a lower horizontal surface 94 of platter 11. As the fluid escapes from fluid chamber 92 through holes 90, the fluid forms a second fluid cushion in area 96 between base 86 and platter 11. When chamber 92 is sufficiently pressurized that the second fluid cushion is formed in the area 96, the second fluid cushion supports the platter above the base, with no contact between the platter and the base.

Base 86 has a preferably horizontally disposed upper planar surface 98 with a major portion, designated by brackets B, symmetrical about axis of rotation A. Upper planar surface 98 of base 86 is configured in planar disposition for complemental, substantially congruent but not contacting relation with lower planar surface 94 of the platter, in the area designated by the brackets B.

Base 86 further has a preferably conical depression means 100 disposed at a central portion of base 86 and surrounded by upper planar surface portion 98 of the base. Platter 11 has a conical extension means 102 extending from the lower horizontal surface of the platter, symmetrical about axis of rotation A. The conical extension means 102 of the platter and the conical depression means of the base are configured for complemental mating in the absence of the second fluid cushion in area 96. The conical extension means and the conical depression means are configured such that when they do mate, the vertical axis of symmetry of platter 11 is coincident with the axis of rotation A of the platter when the platter is rotating above the base. Thus the combination of the complementally mating conical depression means and the conical extension means together forms a self-aligning landing device whereby when the platter is contacting the base and not rotating above the base, the axis of symmetry of the platter, and hence of any disk supported on the platter, may be coincidental with the axis of rotation of the platter when the platter is rotating above the base. Furthermore, due to the geometry of the conical depression means and the conical extension means, some position on these two surfaces will always provide the first point of contact between the platter and the base when the second fluid cushion is removed. When the second fluid cushion is removed and the platter settles onto the base there will normally be a tendency for the platter to try to rotate about an axis through the first point of contact between the platter and the base. By providing the first point of contact between the platter and the base as somewhere on the complemental mating surfaces of the conical extension means and the conical depression means, the axis about which the platter will tend to rotate, upon first contact occuring between the platter and the base, is maintained reasonably close to the normal axis of rotation A. This results in minimal perturbation of the disk supported on the platter as the platter lands on the base.

The portion of upper preferably horizontal preferably planar surface 98 of base 86 denoted by brackets B is a planar surface and is perforate. The portion preferably has an annular configuration and is preferably symmetrical about preferred axis of rotation A. The lower surface 94 of platter 11 likewise has an annularly configured portion in the area denoted by brackets B. The annularly configured portion of lower horizontal planar surface portion of platter 11 preferably has an outer or greater diameter at least as great as the outer or greater diameter of the annular portion of the upper horizontal planar surface portion of base 86 so as to assure that the fluid escaping from fluid chamber 92 through the perforate portion of upper horizontal surface must impinge on lower horizontal surface 94 of the platter.

To achieve complemental mating of conical extension portion 102 and conical depression means 100, the vertices of the two cones preferably have the same vertex angle. Also, preferably but not necessarily, the conical extension portion is slightly longer, from the vertex of the cone to what would be the base of the cone, than is the conical depression means. This, as illustrated, assures that when the platter is fully landed on the base, the platter is supported by the base at the conical extension means only. This provides some slight separation between the lower surface of the platter in the area designated by brackets B and the upper surface of the base in the area designated by brackets B, when the platter is supported on the base, to allow for ease of re-establishment of the second fluid cushion and to allow the second fluid cushion to more easily lift the platter off the base when the reservoir 92 is pressurized with fluid.

Platter 11 preferably has a circumferential solid generally cylindrical skirt extending vertically downwardly from the platter lower horizontal surface. The circumferential skirt extends completely around the platter in a circular disposition with respect to the center of the platter, where disk retaining nib 106 is located, which is coincident with desired axis of rotation A. The skirt extends downwardly from the horizontal portion of the platter preferably at the periphery thereof; the skirt could also be disposed inboard of the periphery of the platter.

Base 86 has a generally cylindrically configured side or lateral outer surface 108 which is perforate for escape therethrough of fluid from fluid chamber 92. The outer diameter of lateral outer surface 108 is less than the inner diameter of skirt 104. The lateral outer surface is symmetric with respect to the desired axis of rotation A. As fluid escapes from fluid chamber 92 through the perforate lateral outer surface 108 of base 86, it impinges the inner surface of skirt 104, thereby forming a third fluid cushion in the area 110, between the skirt and the outer lateral surface of the base.

As fluid escapes through the lateral perforate surface 108 of base 86 and forms the third fluid cushion in area 110, it provides a self stabilizing means for maintaining the platter symmetric about the desired axis of rotation A while the platter is supported on the second fluid cushion above the base 86. In the preferred configuration the perforations in lateral surface 108 are symmetrically distributed with respect to the desired axis of rotation A. However, this is not necessary. Also, in the preferred configuration the perforations are all the same size. Fluid in fluid chamber 92 is at substantially the same pressure throughout chamber 92. Thus, the third fluid cushion will tend to be substantially of uniform thickness and pressure all the way around the outer lateral surface of base 86. If the platter is displaced laterally such that the vertical axis of symmetry of the platter is no longer coincident with the desired axis of rotation A, the third fluid cushion will be compressed between skirt 104 and lateral surface 108 of the base at a position along the line of platter displacement. When the third fluid cushion is thus compressed, the third fluid cushion exerts a larger force on the skirt portion of the platter in the area of compression than the force exerted over the remainder of area 110. This larger force tends to move the platter in a direction opposite the direction of platter displacement, thereby restoring the platter to a position where the vertical axis of symmetry of the platter is again coincident with the desired axis of platter rotation A.

Pressure exerted by the second and third fluid cushions respectively on the horizontal lower planar surface of the platter and the downwardly extending circumferential skirt is proportional to the velocity and pressure of the fluid as the fluid escapes from fluid chamber or reservoir 92 through the perforate portion of the base upper surface and through the perforate portion of the lateral surface of the base. Fluid velocity, for a given size of perforation or hole in the base, as the fluid escapes from the fluid chamber, in turn is proportional to fluid pressure in fluid chamber or reservoir 92. The fluid volume of chamber 92 is preferably large relative to the volume of fluid which escapes through the perforations to form the second and third fluid cushions. Thus, the velocity of fluid in the chamber is substantially zero and fluid pressure in the chamber is substantially uniform throughout. Therefore, so long as the platter is symmetrically disposed with respect to fluid escaping from the fluid chamber through the perforate portion of the upper surface of the base and the perforate circumferential lateral portion of the base, each of the second and third fluid cushions will be of substantially uniform thickness and pressure. Only when the platter is disturbed from its symmetric disposition with respect to the base is the second or third fluid cushion, or both fluid cushions, compressed whereupon the self-compensating action described above, which is inherent in the geometry of the embodiment illustrated, comes into play.

Reference is made to FIG. 5 wherein there is illustrated a second embodiment of a platter and a base or means for supporting the platter. In the embodiment illustrated, the platter 11 is substantially the same as in the embodiment illustrated in FIG. 4, accordingly the platter shown in FIG. 5 is not discussed further here. The base 86A has a fluid chamber 92A therewithin with fluid, preferably air, supplied to chamber or reservoir 92A by fluid input feed pipe 112. A plurality of vertical tubes, with the tubes individually being designated 114, extend from fluid chamber 92A for dispensing fluid therefrom against the lower preferably planar preferably horizontal surface 94 of platter 11. A second plurality of tubes, each tube of said plurality being at least partially horizontal and each individual tube of said plurality being designated 116, extend from base 86A and have horizontally disposed ends for dispensing fluid therefrom against the lateral inner surface of cylindrical skirt 104 extending downwardly from platter 11. Conical extension means 102 extends downwardly at the center of platter 11, from the lower preferably horizontal surface of the platter, and mates with conical depression means 100A disposed at the center of base 86A, when insufficient fluid is flowing from vertical tubes 114 to support platter 11 on a dynamic flow of fluid, which generally forms a second fluid cushion between the ends of the tubes proximate the lower surface of platter 11 and platter 11 itself. The conical extension means 102 and the conical depression means 100A are disposed for complemental mating and also function together in combination as a seld-aligning landing device for platter 11, in the same manner as described above in reference to the conical extension means and conical depression means illustrated in FIG. 4.

During operation, as fluid is emitted from the ends of vertical tubes 114, the fluid supports platter 11 above base 86A with no contact therebetween. The platter 11 is supported by the dynamic force of the fluid emitted, against the lower horizontal surface 94 of the platter, from the ends of the tubes 114. In the resulting raised position of the platter with respect to the base, the platter 11 may rotate about axis A in a substantially frictionless manner.

During operation fluid is also emitted from the ends of the at least partially horizontal tubes 116, against the inner lateral surface of skirt 104, so that the fluid flow impinges against the inner lateral surface of skirt 104. In the preferred configuration, the ends of tubes 116 are disposed symmetrically with respect to the desired axis of platter rotation (and hence conical depression means 100A) so that dynamic pressure is exerted on the inner surface of skirt 104 in a symmetric manner with respect to the desired axis of rotation of platter 11. (Conical depression means 100A is disposed symmetrically with respect to the desired axis of platter rotation.) This symmetrically applied dynamic pressure maintains platter 11 symmetric about the desired axis of platter rotation A as the platter rotates. Any suitable means may be used to rotate platter 11, such as the shade pole motor grouping, the belt drive and other various platter rotation means disclosed herein or known in the art. As the platter rotates, if the platter is displaced such that the actual axis of platter rotation is no longer coincident with the desired axis of platter rotation (a vertical axis passing through the lower vertex 118), dynamic fluid pressure against skirt 104 increases at the portion of the skirt which has moved closer to the ends of tubes 116, since displacement of the platter results in less clearance between the ends of the tubes and the inner surface of the skirt at that location. The increased dynamic pressure against the inner surface of the skirt, resulting from the reduced clearance between the ends of the tubes and the inside of the skirt, tends to move the platter in a direction opposite to the direction of previous displacement, back to the position where the actual axis of platter rotation is coincident with the desired axis of platter rotation. In this connection it should be noted that the conical depression means of the base is always coincidental with the desired axis of platter rotation. However, the conical extension means is aligned with the conical depression means (and hence the desired axis of platter rotation) only either (1) when in mating disposition with the conical depression means portion of the base or (2) when the platter is properly centered above the base and is properly rotating about the desired axis of platter rotation.

Figure 7:
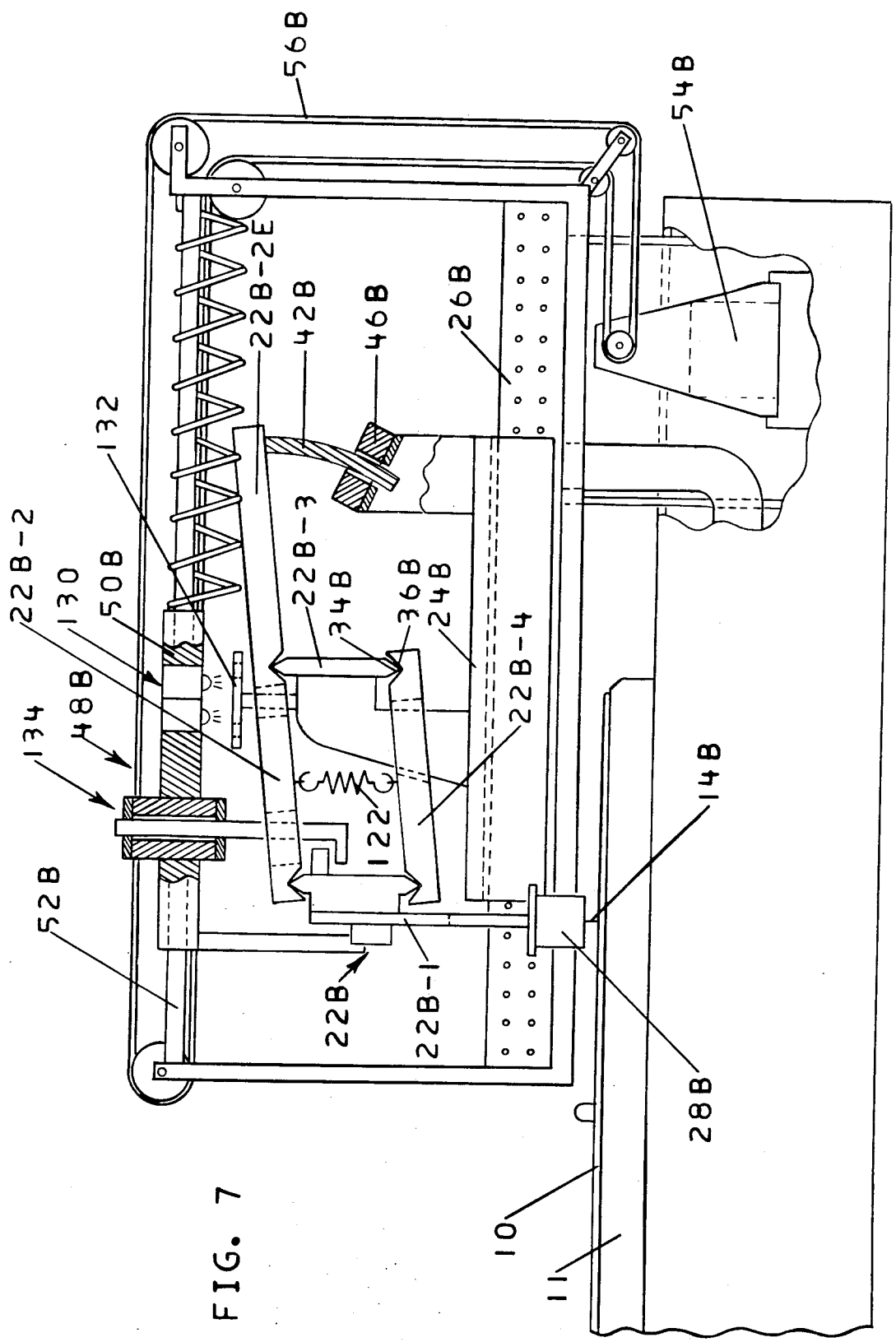
FIG. 7 is a side elevational view of alternative embodiments of four bar linkage apparatus for causing a stylus to track a groove signal on the disk and apparatus for following a stylus as the stylus tracks the groove signal on the rotating disk.

Reference is made to FIG. 7 wherein there is shown an alternative embodiment of a four bar linkage apparatus for tracking a stylus along a line radial to a rotating disk and an alternative embodiment of apparatus for following the stylus — four bar linkage combination as the stylus tracks the disk. Stylus 14B contacts rotating disk 10 and tracks a groove therein, with disk 10 being supported by platter 11; these elements are substantially the same as shown in FIG. 2 and as described with reference thereto and accordingly further discussion of them is not provided here. Stylus 14B is connected via a stylus holder 28B to an extended portion of first bar 22B-1 of four bar linkage 22B. First bar 22B-1 is connected to second bar 22B-2 and to fourth bar 22B-4 by suitable pivotal connection means, a preferred embodiment of which may be formed by the combination of knife edges 34B in engagement with knife edge receivers 36B. Second and fourth bars 22B-2 and 22B-4 are similarly pivotally connected to third bar 22B-3 which in turn is rigidly connected to four bar linkage support means 24B. The four bar linkage support means is moveable along track 26B, preferably in substantially the same manner as the four bar linkage support means described above with reference to FIG. 2. Track 26B is preferably disposed along a line parallel to a line which is radial on disk 10. The line radial on disk 10 is preferably the line along which stylus 14B tracks. The track 26B is preferably substantially similar to the track described above with reference to FIG. 2 and accordingly the movement of the stylus — stylus holder — four bar linkage — four bar linkage support means combination illustrated in FIG. 7 is substantially the same as movement of the analogous combination illustrated in FIG. 2; such movement is not further described herein.

The second and fourth bars 22B-2 and 22B-4 are biased towards each other by four bar linkage bias spring 122, which, in combination with the pivotal connections between the bars, acts to retain the four bar linkage in an assembled disposition. This is in contrast to the embodiment of the four bar linkage illustrated in FIG. 2, where second and fourth bars 22A-2 and 22A-4 are each slightly bowed, with the convex faces of the two bars, convex face 124 of second bar 22A-2 and convex face 126 of fourth bar 22A-4, disposed proximate to each other. The bow of the two bars 22A-2 and 22A-4 produces a spring effect on the third bar; the third bar 22A-3 serves to retain the second and fourth bars 22A-2 and 22A-4 from separating further apart. The retention of the second and fourth bars by the third bar and the bow of the second and fourth bars in combination with the pivotal connection means by which the bars are connected together serves to retain the four bar linkage 22A illustrated in FIG. 2 in an assembled disposition.

Four bar linkage 22B is preferably disposed in a plane perpendicular to disk 10 and, similarly to the four bar linkage illustrated in FIG. 2, is preferably inertially balanced with respect to a vertical axis passing through the two pivotal connection points on third bar 22B-3. More particularly, second bar 22B-2 has an extension portion 22B-2E which extends from the second bar past where the second bar is pivotally connected to third bar 22B-3. Extending downwardly from extended portion 22B-2E is a force receiver means 42B, which preferably is a permanent magnet. Inertial balance of four bar linkage assembly 22B is achieved by constructing the assembly of stylus 14B, stylus connection means 28B, first bar 22B-1 second bar 22B-2, fourth bar 22B-4, second bar extension 22B-2E and force receiver 42B such that the sum of the vertical gravitational moments of all these elements about a vertical axis passing through the pivot points at which second and fourth bars 22B-2 and 22B-4 are connected to third bar 22B-3, is zero. Thus, due to this inertial balance, external vertical accelerations do not affect the four bar linkage assembly illustrated in FIG. 7, for the same reasons that such external vertical components of acceleration do not affect the four bar linkage assembly illustrated in FIG. 2.

Stylus 14B tracks a groove signal in disk 10 as the disk rotates. Stylus 14B tracks preferably from right to left in FIG. 7 due to radial forces exerted on the stylus by the edge of the groove as the groove spirals inward on the rotating disk. This tracking movement of the stylus is preferably the same as described above with reference to the apparatus shown in FIGS. 1 and 2. Similarly to the apparatus shown in FIG. 2, stylus holder 28B, four bar linkage 22B and support means 24B move, preferably on a first cushion, along track 26B as the stylus tracks the groove and moves radially inward on disk 10.

In the embodiment illustrated in FIG. 7, downward force on stylus 14B is produced by exerting an upward force on force receiver means 42B. The required upward force on the force receiver means is produced by coil 46B connected to four bar linkage support means 24B. Force receiver means 42B is preferably a permanent magnet. When a voltage is applied to coil 46B, an electromotive force is induced in force receiver means 42B. The induced force in force receiver means 42B, in the upward direction in FIG. 7, produces a downward force on stylus 14B. The magnitude of the force is controlled by the magnitude of the voltage applied to coil 46B. Similarly to the embodiment illustrated in FIG. 2, as four bar linkage 22B and support means 24B in FIG. 7 move, preferably on a fluid cushion, along track 26B and as stylus 14B tracks the groove and moves radially inward on the disk, a moveable portion of a powered apparatus for following a stylus tracking a groove signal, with the powered apparatus generally designated 48B, senses movement of the stylus — four bar linkage assembly and moves to follow the stylus to carry electrical power to the stylus. The moveable portion of the stylus follower in the embodiment shown in FIG. 7 is again referred to as a carrier and is designated 50B. The carrier 50B moves along an elevated track 52B which is generally elevated above and oriented along a path followed by stylus 14B as it tracks across the disk. Suitable means are provided for moving carrier 50B reciprocably along elevated track 52B. In the embodiment illustrated in FIG. 7, the carrier movement means is the combination of a motor 54B, which as required rotates a pulley thereby moving the second element of the combination, flexible cable or belt 56B. Flexible cable 56B is attached to carrier 50B after passing over a series of conventional pulleys which have not been numbered to aid the clarity of the drawing. Rotation of the shaft of motor 54B may be controlled by any suitable means used to sense movement of the four bar linkage — stylus combination as the combination moves parallel to the plane of the disk as the stylus tracks the groove signal in the disk. In the embodiment illustrated, a combination light source — photocell assembly resident in carrier 50B and designated 130 is provided to sense movement of the stylus — four bar linkage combination and acts as means to transmit a light signal from the carrier to a signal change means embodied as reflector 132 secured to the stylus — four bar linkage combination. Reflector 132 serves as means to change the light signal and to reflect it back to the signal receiving means portion of assembly 130 upon movement of the stylus — four bar linkage combination. In the embodiment illustrated, the movement sensing means applies a light beam to a reflector 132 secured to the non-rotatable third bar 22B-3 of the stylus — four bar linkage combination. The movement sensing means then senses movement of the stylus — four bar linkage combination across the surface of the disk by sensing changes in the position at which the reflected light beam impinges or reflects back on the carrier 50B.

A stylus lifter is secured to carrier 50B and is designated 134. The stylus lifter is preferably comprised of a solenoid-plunger assembly adapted to lift stylus 14B, when the solenoid is actuated, by an extended portion of the solenoid plunger lifting the first bar 22B-1 of the four bar linkage thereby lifting stylus 14B off the disk. The stylus lifter also provides a physical link between the carrier 50B and the four bar linkage so that the carrier drive system may be used to position the stylus and the four bar linkage when the stylus is in a raised position, off the disk. When the stylus lifter is used for this purpose, the carrier movement means is controlled externally, not by the sensed position of the stylus — four bar linkage assembly. Briefly referring back to FIG. 2, this function is also fulfilled by the stylus lifter 66 illustrated there.

Figure 8:
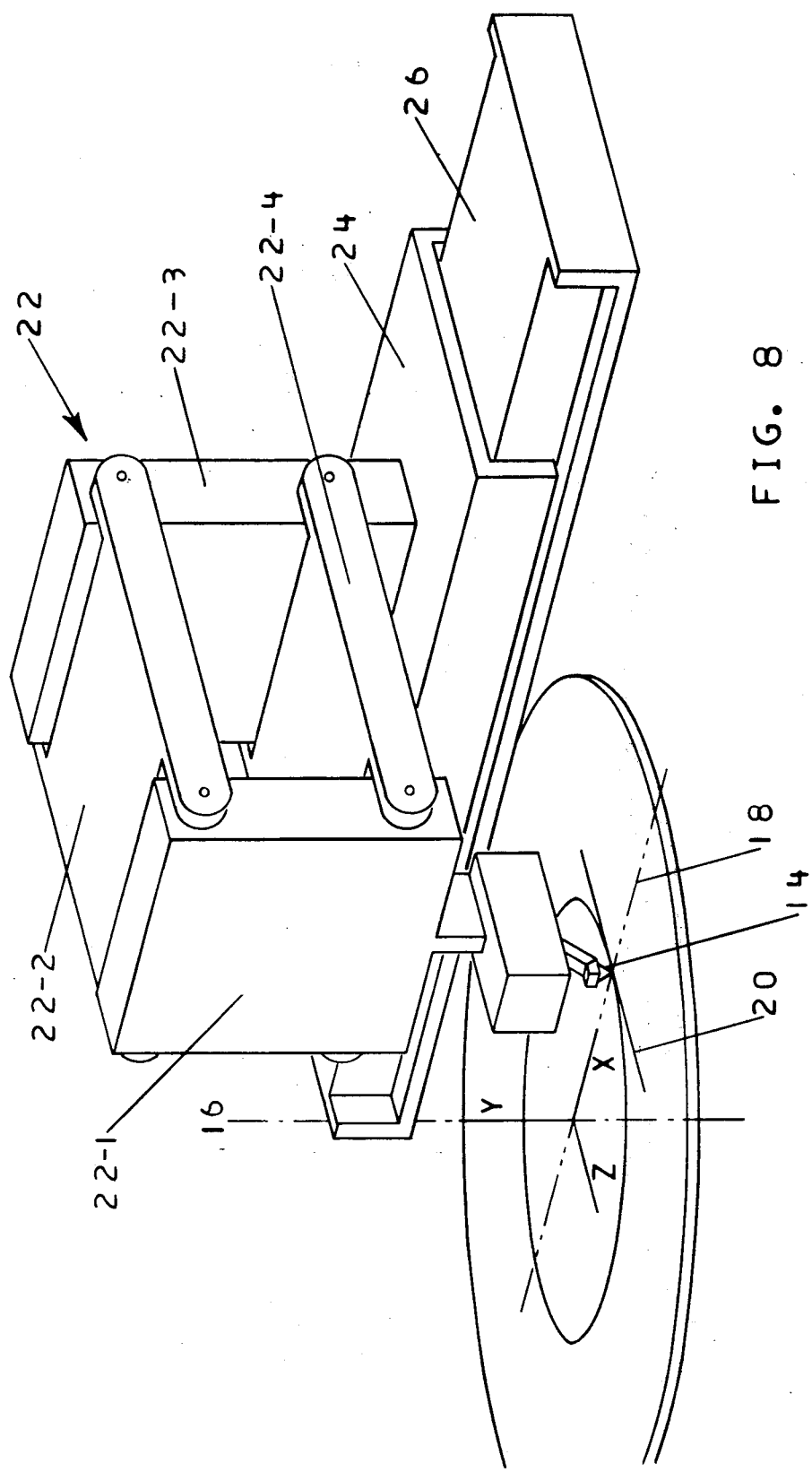
FIG. 8 is a schematic representation of an alternative arrangement of a stylus tracking a groove signal on a rotating disk.

Reference is made to FIG. 8. Although it is preferable that the four bar linkage be disposed with all four bars in a vertical plane which is parallel to the radial line (on the disk) which the stylus tracks, the four bar linkage may also be disposed in other planes which are perpendicular to the plane of the disk but are not parallel to the line the stylus tracks across the disk. One such embodiment is illustrated schematically in FIG. 8 where the four bar linkage 22 has been rotated from the disposition shown in FIG. 1 to a position at which the four bar linkage is in a plane perpendicular to the line 18, which is the radial line on the disk which is tracked by stylus 14. The plane of the four bar linkage is also perpendicular to the plane of the disk. The track 26 remains parallel to line 18, only the four bar linkage has been rotated. Other than the rotated position of the four bar linkage 22, relative to the position shown in FIG. 1, the schematic representation of the various reference lines, the three axis coordinate system, the disk, the stylus, the track and the four bar linkage support mechanism is the same as in FIG. 1.

In the schematic representation of FIG. 8, movement of stylus 14 is constrained to be along line 18, which is perpendicular to the groove tangent line 20, by the four bar linkage 22 which in turn is supported by support means 24. The support means, and hence the four bar linkage, is moveable along track 26.

Generally vertical movement of the stylus due to encounter with disk irregularities, unlike the embodiment illustrated in FIG. 1, will not always be in a plane parallel to line 16 and perpendicular to the surface of the disk at line 18, due to the orientation of the four bar linkage 22. Since the third bar 22-3 of the four bar linkage, in the embodiment illustrated in FIG. 8, cannot move along a direction parallel to line 20, due to the constraining influence of track 26, vertical movement of the stylus, upon the stylus encountering disk vertical irregularities, results in a rotation of second and fourth bars 22-2 and 22-4 about the points at which the second and fourth bars are pivotally mounted to third bar 22-3. This in turn defines a generally but not perfectly vertical motion of first bar 22-1, with stylus 14 secured thereto, with first bar 22-1 moving in a vertical arc about the pivot points at which the second and fourth bars are mounted to the third bar. Hence the stylus moves in an arc about a center which is disposed proximate the pivot points at which the second and fourth bars are attached to the third bar, when the stylus encounters vertical irregularities in the disk. The result of the stylus moving in an arc when the stylus encounters disk vertical irregularities is that the stylus may move off line 18, along line 20. Such movement of the stylus will cause the relative velocity of the stylus with respect to the disk to vary and will also cause the stylus tracking error to become non-zero. However, due to the configuration of the four bar linkage, even as the stylus moves in an arc with the first bar of the fourth bar linkage, the stylus does not rotate with respect to the first bar of the linkage. The stylus does move in a vertically oriented arc with the first bar while at the same time always retaining an orientation perpendicular to a plane parallel to the plane of the disk. This of course is not the case with the apparatus represented schematically in FIG. 1. In that configuration of apparatus, when the stylus encounters a vertical irregularity in the disk, the stylus moves vertically upward along a line perpendicular to the surface of the disk, not in an arc. Hence, in the embodiment illustrated schematically in FIG. 1, the relative velocity of the stylus with respect to the disk taken in the plane of the disk does not change as the stylus encounters disk vertical irregularities.

Although the apparatus illustrated in FIGS. 2 and 7 is described herein in considerable detail with analogy to the schematic representation of apparatus shown in FIG. 1, it is to be understood that the apparatus of FIG. 2 and the apparatus of FIG. 7 could be oriented either as shown in the schematic representation of FIG. 1 or as shown in the schematic representation of FIG. 8 i.e. with the four bar linkage assembly disposed in a plane either parallel or perpendicular to the radial line on the disk which is followed by the stylus. It is also to be understood that the four bar linkage could be disposed in a plane skew to the radial line on the disk which is followed by the stylus. However, the preferred embodiment is with the four bar linkage oriented in a plane parallel to the radial line tracked by the stylus on the disk.

Figure 9:
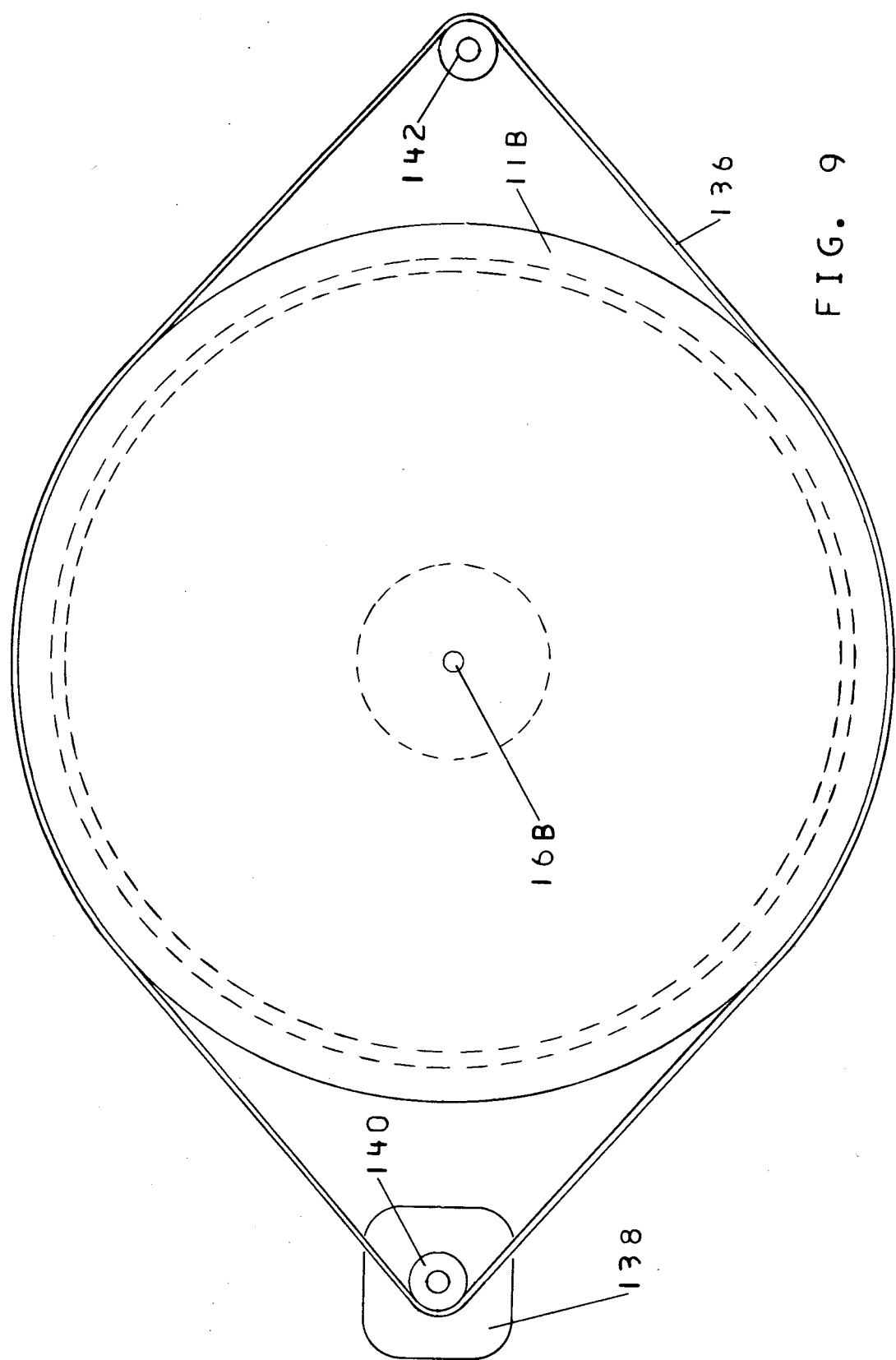
FIG. 9 is a top view of a drive apparatus for a rotatable platter for supporting a disk.

Reference is made to FIG. 9 wherein an alternative embodiment of means for rotating the fluid supported platter is shown. In the embodiment illustrated, the platter is designated 11B and is rotated about an axis 16B by action of a partially circumferential belt 136. The belt contacts a downwardly extending skirt which is not visible in FIG. 9. The skirt is circumferential about axis of rotation 16B and preferably, but not necessarily, extends downward about the periphery of the platter. The belt is driven by a synchronous or other constant RPM motor 138 equipped with a pulley or suitable roller 140 for the belt. An idler pulley or idler roller 142 is located symmetrically with respect to motor roller 138 about axis 16B. Belt 136 passes around the idler pulley as the belt is driven by motor 138, thereby causing the belt to exert a rotational force on the platter. The belt is in contact with both the rollers and the platter. This means that the belt is in a uniform tension condition and exerts radially inward forces, towards axis 16B, on platter 11B in a symmetrical fashion about axis 16B. Since the belt contacts the platter in a symmetrical disposition about axis 16B, the radial forces produced by the belt on the platter are symmetrical, i.e. equal, about the axis; thus the belt does not tend to pull the platter away from the desired axis of rotation 16B. Accordingly the belt drive arrangement shown may be used with a platter supported by fluid such as the embodiments of the platter and fluid support shown in FIGS. 4 and 5 and described above. This belt drive arrangement may also use any number of symmetrically disposed pairs of pulleys, such as pulley 140 associated with motor 138 and idler pulley 142, so long as the pairs of pulleys are located such that the belt contacts the platter at symmetrically disposed pairs of contact areas, exerting radially inward forces thereon, in a symmetrical fashion about the desired axis of platter rotation.

Reference is made to FIG. 10, wherein one embodiment of the inertially balanced tone arm is illustrated schematically. A stylus 14C is held by a stylus holder 28. The stylus 14C and stylus holder 28 together comprise a conventional cartridge 32, which in turn is secured to a tone arm bar 134. Tone arm 134 is pivotable about both vertical and horizontal axes passing through the juncture of tone arm bar 134 and tone arm bar support means 24C, which is the tone arm pivot point. The vertical axis is designated V while the horizontal axis is designated H. At an end of the tone arm bar remote from stylus 14C is a counterbalance mass 29. The tone arm bar 134 is pivotable about the tone arm axes of rotation H and V which pass through the contacting juncture of tone arm bar 134 and tone arm bar support means 24C. Thus the tone arm is pivotally mounted on its support means.

The cartridge 32 includes conventional means for producing an electrical signal proportional to stylus movement in response to irregularities in the signal groove on the rotating disk.

The tone arm bar designated generally 134 has a first portion 134-1 extending from the intersection of the axes of tone arm rotation with cartridge 32 secured to one end thereof, remote from the axes of tone arm rotation. The first portion 134-1 can be of any shape. The first portion 134-1 has a mass $M_1$ with the center of mass located at distance $X_1$, measured along an arbitrary straight line passing through the intersection of the tone arm axes of rotation V and H. Similarly, the cartridge, comprising the stylus and the stylus holder, has a mass designated $M_c$ with the center of mass located at distance $X_c$, measured along the same arbitrary straight line, from the intersection of the tone arm axes of rotation. The tone arm bar also has a second portion, which includes the counterbalance 29, extending from the intersection of the tone arm axes of rotation, with a mass $M_2$ and having its center of mass located a distance $X_2$ from the intersection of the tone arm axes of rotation, where $X_2$ is measured along the same arbitrary straight line as $X_c$ and $X_1$, but in the opposite direction from the intersection of the tone arm axes of rotation. In order to inertially balance the tone arm and its attached apparatus (cartridge, stylus, etc.) with respect to a plane perpendicular to the arbitrary straight line and passing through the tone arm pivot point the sum of the mass moments about the intersection of the tone arm axis of rotation must be zero. This condition is fulfilled if $X_2$ is equal to the quantity $(M_1X_1 \& M_cX_c)$. If a three axis cartesian coordinate system is formed with the first axis coincident with the arbitrary straight line along which the X distances described above are measured and with the juncture of the second and third axes of the coordinate system with the first axis located at the pivot point of the tone arm, it is desirable that the sum of the mass moments about the second and third axes also be zero. If this condition is fulfilled, the tone arm assembly is inertially balanced in all three directions and external accelerations applied to the tone arm through the pivot point will not affect the tone arm.

Since the tone arm is inertially balanced, an external force producing means must be supplied to produce a downward force at the stylus so that the stylus will successfully track the groove signal in the disk as the disk rotates. Any non-gravitational force producing means (a means which produces a force which is not affected by gravity and which is not a function of gravity) which is unaffected by externally applied accelerations may be used. One suitable means is a magnetic coil-iron core combination, similar to that shown with the four bar linkage assembly of FIG. 2. No force producing means has been shown in FIG. 10 to aid the clarity of the drawing.

As noted, for the embodiment of the tone arm illustrated in FIG. 10, it is preferably that the tone arm assembly be inertially balanced with respect to all three axes of a coordinate system having its vertex or origin at the pivot point at which the tone arm assembly is mounted on the tone arm support means. Also as noted in the description above of the various embodiments of four bar linkages disclosed herein for tracking styluses on rotating disks, those four bar linkage assemblies are preferably inertially balanced with respect to a vertical axis passing through the pivot points at which the second and fourth bars are pivotally connected to the third bar. No mention has been made of inertial balance of the four bar linkage assembly about the other two axes of a three axis coordinate system which could be formed with the vertical axis through the pivotal mounting points on the third bar as the first axis of the system. Such inertial balance of a four bar linkage assembly about one or both of these other two axes is generally not necessary since the four bar linkage structure itself prevents any component part of the linkage from moving in either one of these directions (the horizontal directions in FIGS. 2 and 7) without the remainder of the linkage so moving.

Variations, including reversals of parts from those shown, and other modifications, fall within the scope of this invention. The above particular description is by way of illustration and not of limitation. Changes, omissions, additions, substitutions, and/or other modifications may be made without departing from the spirit of the invention. It is to be particularly emphasized that the disclosed principles for stylus tracking and disk support and rotation, and the apparatus disclosed and claimed herein, are also applicable to video disks and styluses, data processing and storage disks and signal pick-ups and in general to all disks having signals disposed therein or thereon. Accordingly, it is intended that the patent shall cover, by suitable expression in the claims, the various features of patentable novelty that reside herein.

What is claimed is:

1. Apparatus for rotating a disk and causing a stylus to track a groove signal therein along a line radial to said disk, comprising:
   (a) a stylus;
   (b) a stylus holder;
   (c) a four bar linkage, moveable parallel to said radial line in response to stylus vertical movement, all four bars coplanar, said stylus holder secured to a first bar thereof, said four bar linkage comprising:
      (i) a first bar generally perpendicular to said disk, moveable vertically unitarily with said stylus holder;
      (ii) a second bar pivotally connected to said first bar and to a third bar for coplanar movement with respect thereto, rotatable in response to vertical movement of said first bar;

(iii) a said third bar pivotally connected to said second bar and a fourth bar for coplanar movement with respect thereto, generally parallel to yet spaced apart from said first bar, moveable parallel to said line radial said disk in response to stylus vertical movement;

(iv) a said fourth bar pivotally connected to said first and third bars, rotatable unitarily with said second bar in response to vertical movement of said first bar and said stylus;

(d) means, moveable along a track line parallel to said line radial to said disk, for supporting said four bar linkage;

(e) track means for guiding said support means along said track line, secured to a base;

(f) a base including means for supporting a platter;

(g) a platter, rotatable on said base about an axis, for supporting said disk; and (h) means, connected to said base, for rotating said platter about said axis.

2. The apparatus of claim 1 further comprising:

(i) a first fluid cushion between said support means and said track means;

and wherein said support means is moveable, on said first fluid cushion, unitarily with said four bar linkage, parallel to said radial line, in response to stylus vertical movement.

3. The apparatus of claim 2 wherein at least a portion of said upper complemental surface of said track is a planar horizontal surface.

4. The apparatus of claim 2 wherein at least an extreme upward portion of said upper complemental surface of said track is a vertex.

5. The apparatus of claim 2 wherein edges of said four bars of said four bar linkage are coplanar in a plane parallel said radial stylus tracking line.

6. The apparatus of claim 2 further comprising:

(j) a second fluid cushion, interposed between said platter and said base, said platter separated from said base thereby, a portion of said platter rotation means separated from said platter as a result thereof.

7. The apparatus of claim 6 wherein said base has an upper surface with at least a major portion symmetric about said axis, wherein said platter has a lower surface with at least a major portion symmetric about said axis, said major portion of said upper surface and said major portion of said lower surface being substantially mirror images.

8. The apparatus of claim 7 wherein said base is stationary and further comprises:

(k) immovable conical depression means symmetric about said axis fixedly connected to said base, surrounded by said upper planar surface of said base, configured for complemental mating, in the absence of said second fluid cushion, with a conical extension means extending downwardly from said platter;

and wherein said platter further comprises:

(1) conical extension means fixedly connected to and extending downwardly from said lower planar surface of said platter and surrounded thereby, rotatable unitarily with said platter, configured for complemental mating in the absence of said second fluid cushion with said conical depression means, when said platter is stationary.

9. The apparatus of claim 8 wherein said base further comprises:

(m) a fluid chamber; wherein said upper planar surface forms a boundary of said fluid chamber, wherein at least a portion of said upper planar surface is perforate for fluid escape therethrough from said fluid chamber thereby forming said second fluid cushion.

10. The apparatus of claim 9 wherein said perforate portion of said upper planar surface of said base has an annular configuration, wherein said lower planar surface of said platter has an annular configuration, the greater diameter of said annularly configured lower planar surface of said platter at least as great as the greater diameter of said annularly configured upper planar surface of said base.

11. Apparatus for rotating a disk and causing a stylus to track a groove signal therein along a line radial to said disk, comprising:

(a) a stylus;

(b) a stylus holder;

(c) a four bar linkage, all four bars coplanar, said stylus holder secured to a first bar thereof, said four bar linkage comprising;

(i) a generally vertical first bar generally perpendicular to said disk, moveable vertically unitarily with said stylus holder;

(ii) a generally horizontal second bar pivotally connected to said first bar and to a third bar for coplanar movement with respect thereto, rotatable in response to vertical movement of said first bar;

said third bar pivotally connected to said second bar and to a fourth bar for coplanar movement with respect thereto, generally parallel to yet spaced apart from said first bar, moveable parallel to said line radial said disk in response to stylus movement;

(iv) said fourth bar, generally horizontal, pivotally connected to said first and third bars, rotatable unitarily with said second bar in response to vertical movement of said first bar;

(d) means, having a generally concave lower surface, moveable along a track line parallel to said line radial to said disk, for supporting said four bar linkage;

(e) track means, having a generally convex upper surface substantially a proportional mirror image of said support means concave surface, for guiding said support means along said track line, secured to a base;

(f) a platter having an annularly configured lower surface with at least a major portion substantially a mirror image of a symmetric upper portion of said base, the greater diameter of said annularly configured lower surface at least as great as the greater diameter of an annularly configured upper surface of said base, rotatable on said base about an axis, for supporting said disk and including conical extension means symmetric about said axis, surrounded by said lower planar surface, extending downwardly from said lower planar surface, configured for complemental mating with a conical depression means portion of said base, in the absence of a fluid cushion therebetween, and including a circumferential generally cylindrical skirt extending vertically downward from said platter, symmetrical about said axis, configured to cylindrically surround a lateral generally cylindrical surface portion of said base;

(g) said base having an annularly configured upper surface with at least a major portion symmetric about said axis of rotation of said platter, including conical depression means symmetric about said axis, surrounded by said upper planar surface, configured for complemental mating with said conical extension means extending from said platter, in the absence of a fluid cushion therebetween, said base including a fluid chamber, said upper planar surface forming a boundary of said fluid chamber wherein at least a portion of said upper planar surface is perforate for fluid escape therethrough to thereby form a second fluid cushion between said platter and said base, including a generally cylindrically configured perforate lateral surface of outer diameter less than an inner diameter of said solid generally cylindrical skirt portion of said platter, forming a boundary of said fluid chamber such that fluid can escape therethrough from said fluid chamber thereby forming a third fluid cushion;

(h) means, connected to said base, for rotating said platter about said axis;

(i) a first fluid cushion between said support means and said track means;

(j) a second fluid cushion, between said platter and said base; and (k) a third fluid cushion between said skirt portion of said platter and said generally cylindrically configured lateral surface of said base.

12. The apparatus of claim 11 wherein said means for rotating the platter further comprises:

(q) force receiving means disposed circumferentially about said platter; and (r) at least one pair of force transmitting means secured to said base, each member of each pair disposed diametrically, with respect to said axis, opposite the remaining member of said pair, said pairs disposed symmetrically, with respect to said axis, about said platter;

whereby when force is transmitted from said force transmitting means to said force receiving means, said platter is rotated, about said axis, above said base.

13. Apparatus for rotating a disk and causing a stylus to track a groove signal therein along a line radial to said disk, comprising:

(a) a stylus;
(b) a stylus holder;
(c) a four bar linkage moveable parallel to said radial line in response to stylus movement along said line, all four bars coplanar in a plane perpendicular to said radial stylus tracking line, said stylus holder secured to a first bar thereof, said four bar linkage comprising;

(i) a first bar generally perpendicular to said disk, moveable generally vertically unitarily with said stylus holder;
(ii) a second bar pivotally connected to said first bar and to a third bar for coplanar movement with respect thereto, rotatable in response to generally vertical movement of said first bar as said stylus encounters groove vertical irregularities;
(iii) said third bar pivotally connected to said second bar and to a fourth bar, generally parallel to yet spaced apart from said first bar, moveable longitudinally parallel to said line radial to said disk unitarily with said stylus in response to stylus movement along said line as said stylus tracks said disk;
(iv) said fourth bar pivotally connected to said first and third bars, rotatable unitarily with said second bar in response to generally vertical movement of said first bar and said stylus as said stylus encounters groove vertical irregularities;

(d) means, moveable along a track line parallel to said line radial to said disk, for supporting said four bar linkage;
(e) track means for guiding said support means along said track line, secured to a base;
(f) a base including means for supporting a platter;
(g) a platter, rotatable on said base about an axis, for supporting a disk; and
(h) means, connected to said base, for rotating said platter about said axis.

14. The apparatus of claim 13 wherein said support means is rigidly connected to said third bar.

15. Apparatus for rotating a disk and causing a stylus to track a groove signal therein along a line radial to said disk, comprising:

(a) a stylus;
(b) a stylus holder;
(c) a four bar linkage all four bars coplanar, said stylus holder secured to a first bar thereof, said four bar linkage comprising:

(i) a generally vertical first bar generally perpendicular to said disk, moveable vertically unitarily with said stylus holder;
(ii) a second bar, generally horizontal, pivotally connected to said first bar and to a third bar for coplanar movement with respect thereto, rotatable in response to vertical movement of said first bar;
(iii) said third bar pivotally connected to second bar and to a fourth bar for coplanar movement with respect thereto, generally parallel to yet spaced apart from said first bar, moveable parallel to said line radial to said disk in response to stylus movement;
(iv) said fourth bar, generally horizontal, pivotally connected to said first and third base, rotatable unitarily with said second bar in response to vertical movement of said first bar;

(d) means having a lower generally concave surface, moveable along a track line parallel to said line radial to said disk, for supporting said four bar linkage, rotatably connected to said four bar linkage mediate said second and fourth bars;
(e) track means for guiding said support means along said track line, having an upper perforate generally convex surface complemental with and a substantially proportional mirror image of said concave lower surface of said support means, including a fluid plenum having one boundary thereof formed by said upper perforate complemental surface whereby fluid passing from said plenum through said perforate surface may form a first fluid cushion along a part of said track by impinging against a lower concave surface of said support means;
(f) a base including means for supporting a platter;
(g) a platter, rotatable on said base about an axis, for supporting said disk;
(h) means, connected to said base, for rotating said platter about said axis; and (i) a first fluid cushion between said support means and said track means.

16. Apparatus for rotating a disk and causing a stylus to track a groove signal therein along a line radial to said disk, comprising:
(a) a stylus;
(b) a stylus holder;
(c) a four bar linkage all four bars coplanar, said stylus holder secured to a first bar thereof, said four bar linkage comprising:
  (i) a generally vertical first bar generally perpendicular to said disk, moveable vertically unitarily with said stylus holder;
  (ii) a second bar, generally horizontal, pivotally connected to said first bar and to a third bar for coplanar movement with respect thereto, rotatable in response to vertical movement of said first bar;
  (iii) said third bar pivotally connected to said second bar and to a fourth bar for coplanar movement with respect thereto, generally parallel to yet spaced apart from said first bar, moveable parallel to said line radial to said disk in response to stylus movement;
  (iv) said fourth bar, generally horizontal, pivotally connected to said first and third bars, rotatable unitarily with said second bar in response to vertical movement of said first bar;
(d) means moveable along a track line parallel to said line radial to said disk, for supporting said four bar linkage, having a lower generally concave surface;
(e) track means for guiding said support means along said track line, secured to a base, having an upper generally convex perforate surface substantially a proportional mirror image of said concave lower surface of said support means, said track including a fluid plenum having one boundary thereof formed by said upper generally convex surface, whereby fluid passing through said convex perforate surface along at least a part of said track forms a first fluid cushion by impinging against said lower concave surface of said support means;
(f) a base including means for supporting a platter, said base further including
  (1) a fluid chamber;
  (2) a plurality of vertical tubes extending from said fluid chamber, for dispensing fluid against a lower planar surface of a platter from tube ends remote said chamber; and
  (3) a plurality of at least partially horizontal tubes extending from said fluid chamber, for dispensing fluid against an inner surface of a circumferential generally cylindrical skirt extending downwardly from a platter, from horizontal tube ends remote said chamber;
(g) said platter, rotatable on said disk about an axis, for supporting said disk, having a lower planar horizontal surface for impingement thereagainst by fluid emitted from said plurality of vertical tubes, said platter further including:
  (1) a circumferential generally cylindrical skirt extending downwardly, symmetrical about said axis for contact thereagainst by fluid emitted from said at least partially horizontal tubes;
whereby when fluid is dispensed from said vertical tubes, said platter is dynamically supported above the tube ends by said fluid emitted therefrom and whereby when fluid is dispensed from said at least partially horizontal tubes, said platter is dynamically maintained peripherally about the horizontal tube ends by fluid emitted therefrom and impinging on the inner surface of said circumferential skirt;
(h) means, connected to said base, for rotating said platter about said axis; and
(i) a first fluid cushion between said support means and said track means.

17. The apparatus of claim 16 wherein said base further comprises:
(x) conical depression means symmetric about said axis, configured for complemental mating, when no fluid is dispensed from said vertical tubes, with a conical extension means extending from said platter;
wherein said platter further comprises:
(y) conical extension means extending downwardly from said lower planar surface of said platter and surrounded thereby, configured for complemental mating, when no fluid is dispensed from said vertical tubes, with said conical depression means.

18. The apparatus of claim 17 wherein the horizontal ends of said at least partially horizontal tubes are disposed symmetrically with respect to said axis, and wherein the ends of said vertical tubes remote said chamber are disposed symmetrically with respect to said axis.

19. In a system for reproducing a groove signal from a rotating disk, apparatus for tracking a stylus along a line radial to said disk, comprising in combination:
(a) a four bar linkage, all four bars coplanar, said four bar linkage comprising:
  (i) a first bar generally perpendicular to said disk moveable unitarily with a stylus holder;
  (ii) a second bar generally parallel to said disk, pivotally connected to said first bar and a third bar for rotational movement coplanar with respect thereto, rotatable in response to movement of said first bar perpendicular to said disk;
  (iii) said third bar pivotally connected to said second bar and to a fourth bar, generally parallel to yet spaced apart from said first bar; and
  (iv) said fourth bar, parallel to said second bar, intermediate said second bar and said disk, pivotally connected to said first and third bars, rotatable unitarily with said second bar in response to movement of said first bar perpendicular to said disk;
(b) stylus holder means for connecting said stylus to said first bar; and
(c) means for supporting said four bar linkage, moveable along a line parallel to said radial line.

20. The apparatus of claim 19 wherein said support means is moveable along a track, and wherein said apparatus further comprises:
(d) a track parallel to said radial line.

21. The apparatus of claim 20 further comprising:
(e) a fluid cushion between said support means and said track.

22. The apparatus of claim 21 further comprising:
(f) means for exerting a force on said four bar linkage at a position to produce a vertically downward force on said first bar.

23. The apparatus of claim 22 wherein said force exertion means is a means for exerting a non-gravitational force on said four bar linkage at a position to produce a nongravitational vertically downward force on said first bar.

24. The apparatus of claim 23 wherein said nongravitational force exertion means further comprises:
(g) an electromagnetic coil secured to said support means;
(h) a magnet insertable into said coil, connected to said four bar linkage at said position;
(i) means for supplying electrical energy to said coil; whereby when said magnet is inserted into said coil and electrical energy is applied thereto, said magnet applies force to said four bar linkage at said position whereby a vertically downward force on said first bar results.

25. The apparatus of claim 24 wherein said support means is pivotally connected to said four bar linkage mediate said second and fourth bars.

26. The apparatus of claim 24 wherein said third bar is rigidly connected to said support means.

27. The apparatus of claim 26 wherein said magnet is secured to said second bar.

28. The apparatus of claim 26 wherein said megnet is secured to said fourth bar.

29. The apparatus of claim 26 wherein edges of said first bar, said second bar, said third bar and said fourth bar are parallel to said radial line.

30. The apparatus of claim 26 wherein said first bar, said second bar, said third bar and said fourth bar are all perpendicular to said radial line.

31. Apparatus for supporting and rotating a horizontal disk, from below, about an axis of rotation of said disk, comprising:
(a) a platter having an annularly configured lower surface with at least a major portion substantially a mirror image of a symmetric upper portion of a base, the greater diameter of said annularly configured lower surface at least as great as the greater diameter of an annularly configured upper surface of said base, rotatable on said base about an axis, for supporting said disk and including conical extension means symmetric about said axis, surrounded by said lower planar surface, extending downwardly from said lower planar surface, configured for complemental mating with a conical depression means portion of said base, in the absence of a fluid cushion therebetween and including a circumferential generally cylindrical skirt extending vertically downwardly from said platter symmetrical about said axis, configured to cylindrically surround a lateral generally cylindrical surface portion of said base;
(b) said base having an annularly configured upper surface with at least a major portion symmetric about an axis of rotation of said platter, including conical depression means symmetric about said axis, surrounded by said upper planar surface, configured for complemental mating with said conical extension means extending from said platter, in the absence of a fluid cushion therebetween, said base including a fluid chamber, said upper planar surface forming a boundary of said fluid chamber wherein at least a portion of said upper planar surface is perforate for fluid escape therethrough to thereby form a second fluid cushion between said platter and said base, including a generally cylindrically configured perforate lateral surface of outer diameter less than an inner diameter of said solid generally cylindrically skirt portion of said platter, forming a boundary of said fluid chamber such that fluid can escape therethrough from said fluid chamber thereby forming a fluid cushion, designated as a third fluid cushion;
(c) means, connected to said base, for rotating said platter about said axis;
(d) a fluid cushion between said base upper planar surface and said platter; and
(e) a fluid cushion, designated as a third fluid cushion, between said skirt portion of said platter and said generally cylindrically configured lateral surface of said base.

32. The apparatus of claim 31 wherein said means for rotating the platter further comprises:
(k) force receiving means disposed circumferentially about said platter; and
(l) at least one pair of force transmitting means secured to said base, each member of each pair disposed diametrically, with respect to said axis, opposite the remaining member of said pair, said pairs disposed symmetrically, with respect to said axis, about said platter;
whereby when force is transmitted from said force transmitting means to said force receiving means, said platter is rotated about said axis above said base.

33. In a system for reproducing a groove signal from a rotating disk, improved apparatus for tracking a stylus along a line radial to said disk, comprising in combination:
(a) a cartridge having mass $m_c$, comprising:
 (i) a stylus; and
 (ii) a stylus holder including means for producing an electrical signal proportional to stylus movement;
(b) a four bar linkage disposed in a plane perpendicular said disk, comprising:
 (iii) a first bar having mass $m_{B1}$, pivotally connected to second and fourth bars, having a center of mass located distance $x_{B1}$ from a position at which a third bar is connected to a means for supporting said four bar linkage;
wherein said cartridge is secured to said first bar with the center of mass of the cartridge located distance $x_c$ from said third bar connection position;
 (iv) said second bar having mass $m_{B2}$, pivotally connected to said first and third bars, having a center of mass located distance $x_{B2}$ from said third bar connection position;
 (v) said third bar pivotally connected to said second and fourth bars, connected to means for supporting said four bar linkage;
 (vi) said fourth bar, parallel to said second bar, having mass $m_{B4}$, pivotally connected to said first and third bars, having a center of mass located distance $x_{B4}$ from said third bar connection position;
(c) means for counterbalancing said cartridge, said first bar, said second bar and said fourth bar about said third bar connection position, having mass $m_{cB}$ and having a center of mass located distance $(m_c x_c \,\&\, m_{B1} x_{B1} \,\&\, m_{B2} x_{B2} \,\&\, m_{B4} x_{B4})/m_{CB}$ from said third bar connection position; and
(d) means for supporting said four bar linkage, said cartridge and said counterbalance means, moveable parallel said radial line;
whereby the assembly of said four bar linkage, said cartridge and said counterbalance means is inertially balanced with respect to vertical components of accelerations applied thereto through said four bar linkage support means.

34. The improved apparatus of claim 33 wherein said counterbalance means further comprises means for exerting a force on said four bar linkage at a position to produce a vertically downward non-gravitational force on said first bar and said cartridge, and wherein said counterbalance means mass includes the mass of said force exertion means.

35. The improved apparatus of claim 33 further comprising:
  (e) means for exerting a force on said four bar linkage at a position to produce a vertically downward non-gravitational force on said first bar and said cartridge.

36. A method for tracking a stylus in a signal groove in a rotating disk, comprising the steps of:
  (a) orienting all four bars of a four bar linkage in a plane which is perpendicular to said disk, arbitrarily designated first and third bars of said linkage being generally parallel, arbitrarily designated second and fourth bars of said linkage being generally parallel, said first bar pivotally connected to said second and fourth bars constrained to move rotationally with respect to said second and fourth bars in said plane perpendicular to said disk, said second bar generally above said fourth bar, said third bar pivotally connected to said second and fourth bars constrained so said second and fourth bars move rotationally with respect to said third bar in said plane perpendicular to said disk in response to vertical movement of said first bar with said stylus;
  (b) positioning said stylus, connected to said arbitrarily designated first bar of said four bar linkage, in said signal groove;
  (c) simultaneously:
    (i) applying a vertically downward non-gravitational force to said stylus by application of a nongravitational downward force to said first bar;
    (ii) allowing said stylus to move vertically upon encounter with groove vertical irregularities, said first bar moving vertically unitarily therewith;
    (iii) restraining said stylus from rotating about the point at which said stylus contacts the disk by restraining said first bar from moving outside said plane within which said four bar linkage is oriented; and
    (iv) allowing said stylus to follow said groove, along a straight line towards the axis of rotation of the disk, as said groove spirals inward on said disk as the disk rotates, said four bar linkage moving unitarily parallel to said straight line path of said stylus in response to movement of said stylus.

37. The method of claim 36 wherein the plane, in which said four bars of said four bar linkage are oriented, is parallel to said straight line, wherein said four bar linkage moves parallel to said straight line unitarily with said stylus as said stylus moves along said straight line due to frictional contact with said groove.

38. The method of claim 36 wherein the plane, in which said four bars of said four bar linkage are oriented, is coincidental with said straight line, wherein said four bar linkage moves along said straight line unitarily with said stylus as said stylus moves along said straight line due to frictional contact with said groove.

39. The method of claim 36 wherein the plane, in which said four bars of said four bar linkage are oriented, is perpendicular to said straight line.

40. The method of claim 36 wherein sub-step (i) of step (c) is performed by applying a non-gravitational force to at least one of said four bars.

41. The method of claim 36 wherein sub-step (i) of step (c) is performed by applying a non-gravitational force to at least one of said four bars with an electromagnet.

* * * * *